US009032825B2

(12) United States Patent
Okubo et al.

(10) Patent No.: US 9,032,825 B2
(45) Date of Patent: May 19, 2015

(54) VEHICLE DRIVING SYSTEM

(75) Inventors: Shinichi Okubo, Saitama (JP);
Takayuki Kishi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 13/582,666

(22) PCT Filed: Mar. 16, 2011

(86) PCT No.: PCT/JP2011/056313
§ 371 (c)(1),
(2), (4) Date: Sep. 4, 2012

(87) PCT Pub. No.: WO2011/125446
PCT Pub. Date: Oct. 13, 2011

(65) Prior Publication Data
US 2013/0000444 A1  Jan. 3, 2013

(30) Foreign Application Priority Data
Mar. 31, 2010  (JP) .................................. 2010-081009

(51) Int. Cl.
*F16H 3/08* (2006.01)
*B60K 6/48* (2007.10)
(Continued)

(52) U.S. Cl.
CPC ............. *B60K 6/48* (2013.01); *Y10T 74/19014* (2015.01); *B60K 6/547* (2013.01); *B60K 2006/4825* (2013.01); *B60K 2006/4841* (2013.01); *F16H 3/006* (2013.01); *F16H 2200/0082* (2013.01); *F16H 2200/0086* (2013.01); *Y02T 10/6221* (2013.01); *Y02T 10/6252* (2013.01)

(58) Field of Classification Search
CPC .......... B60K 6/365; B60K 6/40; B60K 6/445; B60K 6/547; B60L 11/14; F16H 3/093; F16H 3/14; F16H 59/08; F16H 61/02; F16H 63/50
USPC ........... 74/325, 329, 330, 331, 335, 340, 661, 74/665 Q, 360; 476/42
See application file for complete search history.

(56) References Cited

U.S. PATENT DOCUMENTS 3,691,861 A * 9/1972 Sturmer .......................... 74/330
4,461,188 A * 7/1984 Fisher ............................. 74/330
6,634,247 B2 * 10/2003 Pels et al. ........................ 74/329

(Continued)

FOREIGN PATENT DOCUMENTS

JP  2002-089594 A  3/2002
JP  2006-527337 A  11/2006

OTHER PUBLICATIONS

International Search Report for PCT/JP2011/056313, mailing date of Jun. 14, 2011.

*Primary Examiner* — William Kelleher
*Assistant Examiner* — Thomas Magnuson
(74) *Attorney, Agent, or Firm* — Westerman, Hattori, Daniels & Adrian, LLP

(57) ABSTRACT

A reverse gear set, which is adapted to be connected to a second input shaft and to be connected selectively to a first input shaft via a third switching unit, is provided in a transmission of a vehicle driving system, whereby a reverse driving can be implemented by rotating the first input shaft in a reverse direction to a direction in which the first input shaft rotates for a forward driving using the power of at least one of an engine and a motor, and plural gear of an odd-numbered gear train can be selected by first switching units.

7 Claims, 15 Drawing Sheets

(51) Int. Cl.
    *B60K 6/547*    (2007.10)
    *F16H 3/00*    (2006.01)

(56) References Cited

U.S. PATENT DOCUMENTS

| | | | |
|---|---|---|---|
| 7,448,290 B2 * | 11/2008 | Gitt | 74/331 |
| 8,408,342 B2 * | 4/2013 | Wang et al. | 180/65.265 |
| 2002/0033059 A1 | 3/2002 | Pels et al. | |
| 2006/0117882 A1 | 6/2006 | Gitt | |
| 2008/0034905 A1 * | 2/2008 | Hatori et al. | 74/330 |
| 2011/0061493 A1 * | 3/2011 | Bartling et al. | 74/665 D |
| 2014/0000412 A1 * | 1/2014 | Kaltenbach | 74/661 |

* cited by examiner

<SECOND SPEED DRIVING>

US 9,032,825 B2

VEHICLE DRIVING SYSTEM

TECHNICAL FIELD

The present invention relates to a vehicle driving system which includes an internal combustion engine and an electric motor.

BACKGROUND ART

There have conventionally been known hybrid vehicle driving systems which include an internal combustion engine and an electric motor (for example, refer to Patent Document 1).

A vehicle driving system 200 of Patent Document 1 includes, as shown in FIG. 15, a dual-clutch type transmission mechanism which includes, in turn, a first input shaft 202a which is connected to an electric motor 210 and which is selectively connected to an internal combustion engine output shaft 204 by a first engaging and disengaging means 205, a second input shaft 202b which is selectively connected to the internal combustion engine output shaft 204 by a second engaging and disengaging means 206, an output shaft 203 which outputs power to a driven portion, a first gear train including plural gears which are selectively connected to the first input shaft 202a via first synchromesh units 230, 231 which are disposed on the first input shaft 202a, a second gear train including plural gears which are selectively connected to the second input shaft 202b via second synchromesh units 216, 217 which are disposed on the second input shaft 202b, and a third gear train which is disposed on the output shaft 203 and which includes plural gears which mesh with the gears of the first gear train and the gears of the second gear train, and a reverse gear set R, which is selectively connected to the second input shaft 202b via a second synchromesh unit 217, is provided on the second input shaft 202b to which the electric motor 210 is not connected.

RELATED ART DOCUMENT

Patent Document

Patent Document 1: JP-A-2002-89594

SUMMARY OF THE INVENTION

Problems to be Solved by the Invention

In the vehicle driving system 200 of Patent Document 1 described above, however, the reverse driving can be implemented only by the reverse gear set R which is set in advance, and hence, no desired reduction ratio cannot be selected according to conditions. Thus, there still exists room for improvement.

The invention has been made in view of the situations described above, and an object thereof is to provide a vehicle driving system which enables the selection of plural gears even in reverse driving.

Means for Solving the Problems

With a view to attaining the object, according to a first aspect of the invention, a vehicle driving system (for example, vehicle driving systems 1, 1A, 1B in embodiments that will be described later) including:

an internal combustion engine (for example, an engine 6 in the embodiments);

an electric motor (for example, a motor 7 in the embodiments); and a transmission mechanism (for example, transmissions 20, 20A in the embodiments) including a first input shaft (for example, a first main shaft 11 in the embodiments) which is connected to the electric motor and which is connected selectively to the internal combustion engine via a first engaging and disengaging means (for example, a first clutch 41 in the embodiments), a second input shaft (for example, a second intermediate shaft 16 in the embodiments) which is connected selectively to the internal combustion engine via a second engaging and disengaging means (for example, a second clutch 42 in the embodiments), an output shaft (for example, a counter shaft 14 in the embodiments) which outputs power to a driven portion (for example, driving wheels DW, DW in the embodiments); a first gear train which is disposed on the first input shaft and which is made up of plural gears (for example, a planetary gear mechanism 30, a third speed drive gear 23a, a fifth speed drive gear 25a, a seventh speed drive gear 97a in the embodiments) which are connected selectively to the first input shaft via a first switching unit (for example, a lock mechanism 61, a first gear change shifter 51, a first odd-numbered gear change shifter 51A, a second odd-numbered gear change shifter 51B in the embodiments), a second gear train which is disposed on the second input shaft and which is made up of plural gears (for example, a second speed drive gear 22a, a fourth speed drive gear 24a, a sixth speed drive gear 96a in the embodiments) which are connected selectively to the second input shaft via a second switching unit (for example, a second gear change shifter 52, a first even-numbered gear change shifter 52A, a second even-numbered gear change shifter 52B in the embodiments), and a third gear train which is disposed on the output shaft and which is made up of plural gears (for example, a first common driven gear 23b, a second common driven gear 24a, a third common driven gear 96b) which mesh with the gears of the first gear train and the gears of the second gear train, characterized in that a reverse gear set (for example, a reverse gear set 28 in the embodiments) is provided in the transmission mechanism which is connected to the second input shaft and which is connected selectively to the first input shaft via a third switching unit (for example, a reverse shifter 53 in the embodiments), in that a reverse driving can be implemented by rotating the first input shaft in a reverse direction to a direction in which the first input shaft rotates to implement a forward driving by means of power of at least one of the internal combustion engine and the electric motor, and in that plural gears of the first gear train can be selected by the first switching unit.

In addition, according to a second aspect of the invention, there is provided a vehicle driving system, characterized in that by engaging the third switching unit and applying the second engaging and disengaging means, the reverse driving is implemented by the power of the internal combustion engine.

Additionally, according to a third aspect of the invention, there is provided a vehicle driving system, characterized in that the electric motor is driven in a reverse direction to a direction in which the electric motor is driven for a forward driving during the reverse driving by the internal combustion engine so as to add the power of the electric motor.

In addition, according to a fourth aspect of the invention, there is provided a vehicle driving system, characterized in that an EV reverse driving is implemented by releasing the first and second engaging and disengaging means and driving the electric motor in the reverse direction to the direction in which the electric motor is driven for the forward driving.

Additionally, according to a fifth aspect of the invention, there is provided a vehicle driving system, characterized in that an air conditioner compressor (for example, an air conditioner compressor 112A, an electric air conditioner compressor 112B in the embodiments), which is adapted to rotate only when the first input shaft rotates for the forward driving, is connected to the first input shaft via an air conditioner clutch (for example, an air conditioner clutch 121 in the embodiments), and in that when the reverse driving is implemented, the air conditioner clutch is released so that a reverse rotation of the first input shaft is not transmitted to the air conditioner compressor to thereby rotate the air conditioner compressor idly.

In addition, according to a sixth aspect of the invention, there is provided a vehicle driving system, characterized in that when the EV reverse driving is implemented, the internal combustion engine is kept running with the first and second engaging and disengaging means kept released.

Additionally, according to a seventh aspect of the invention, there is provided a vehicle driving system, characterized in that a reverse shaft (for example, a reverse shaft 17 in the embodiments), which is disposed parallel to the first and second input shafts, is provided in the transmission mechanism, in that a reverse drive gear (for example, a reverse drive gear 28*a* in the embodiments), which is adapted to be connected selectively to the reverse shaft via the third switching unit, is provided on the reverse shaft, in that a reverse driven gear (for example, a reverse driven gear 28*b* in the embodiments), which is mounted so as to mesh with the reverse drive gear to thereby rotate together with the first input shaft, is provided on the first input shaft, and in that the reverse shaft is connected to the second input shaft via an idle gear set (for example, a first idle gear set 27A, a second idle gear set 27B in the embodiments).

Advantage of the Invention

According to the vehicle driving system of claim 1, when the reverse driving is implemented, the power is transmitted to the output shaft by way of the first gear train which is disposed on the first input shaft, and therefore, an optimum gear can be selected from the plural gears of the first gear train in accordance with driving conditions.

According to the vehicle driving system of Claim 2, when the reverse driving is implemented by the internal combustion engine, the power is transmitted by way of the reverse gear set in addition to the first gear train, and therefore, the gear ratio between the gears that are changed is increased, thereby making it possible to obtain a high torque.

According to the vehicle driving system of claim 3, the reverse driving by the internal combustion engine can be assisted by the electric motor. By so doing, a high torque can be obtained even in the reverse driving implemented as when the vehicle climbs up on a steep gradient.

According to the vehicle driving system of claim 4, the EV reverse driving can be implemented to thereby increase the fuel economy.

According to the vehicle driving system of claim 5, an inexpensive scroll compressor can be used which can rotate only in one direction. Even when such a scroll compressor is used, by releasing the air conditioner clutch so that no reverse rotation is transmitted, the scroll compressor can safely be used. In addition, by releasing the air conditioner clutch, the load can be reduced, thereby making it possible to ensure a driving torque even when torque is necessary.

According to the vehicle driving system of claim 6, the reverse driving is used much when the vehicle is driven forwards and backwards frequently and repeatedly for parking. When the vehicle is driven forwards, the first engaging and disengaging means is applied, and the vehicle is driven by means of the power of the internal combustion engine while regeneration is being implemented by the electric motor. When the vehicle is driven backwards, the vehicle is driven backwards through the EV reverse driving, and when torque is needed during the EV reverse driving, the second engaging and disengaging means is applied so as to make use of the internal combustion engine.

According to the driving system of claim 7, the reverse driving is implemented by way of the idle gear set in addition to the reverse gear set and the gear sets of the first gear train, and therefore, a larger gear ratio can be obtained between gears that are changed.

MODES FOR CARRYING OUT THE INVENTION

Hereinafter, embodiments of hybrid vehicle driving systems of the invention which can install a control unit will be described by reference to the drawings.

First Embodiment

Figure 1:
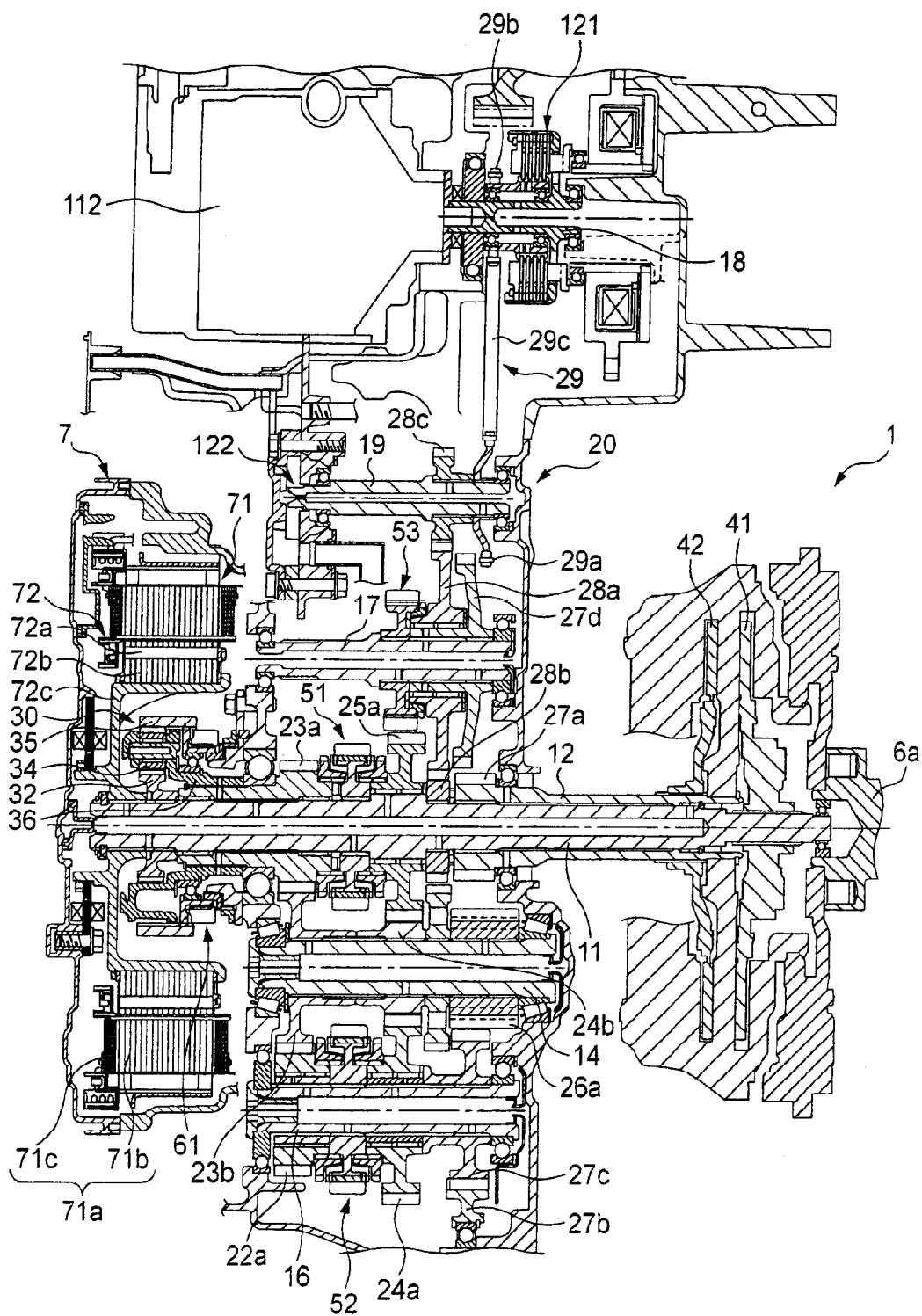
FIG. 1 is a sectional view showing a vehicle driving system of a first embodiment of the invention.
Figure 2:
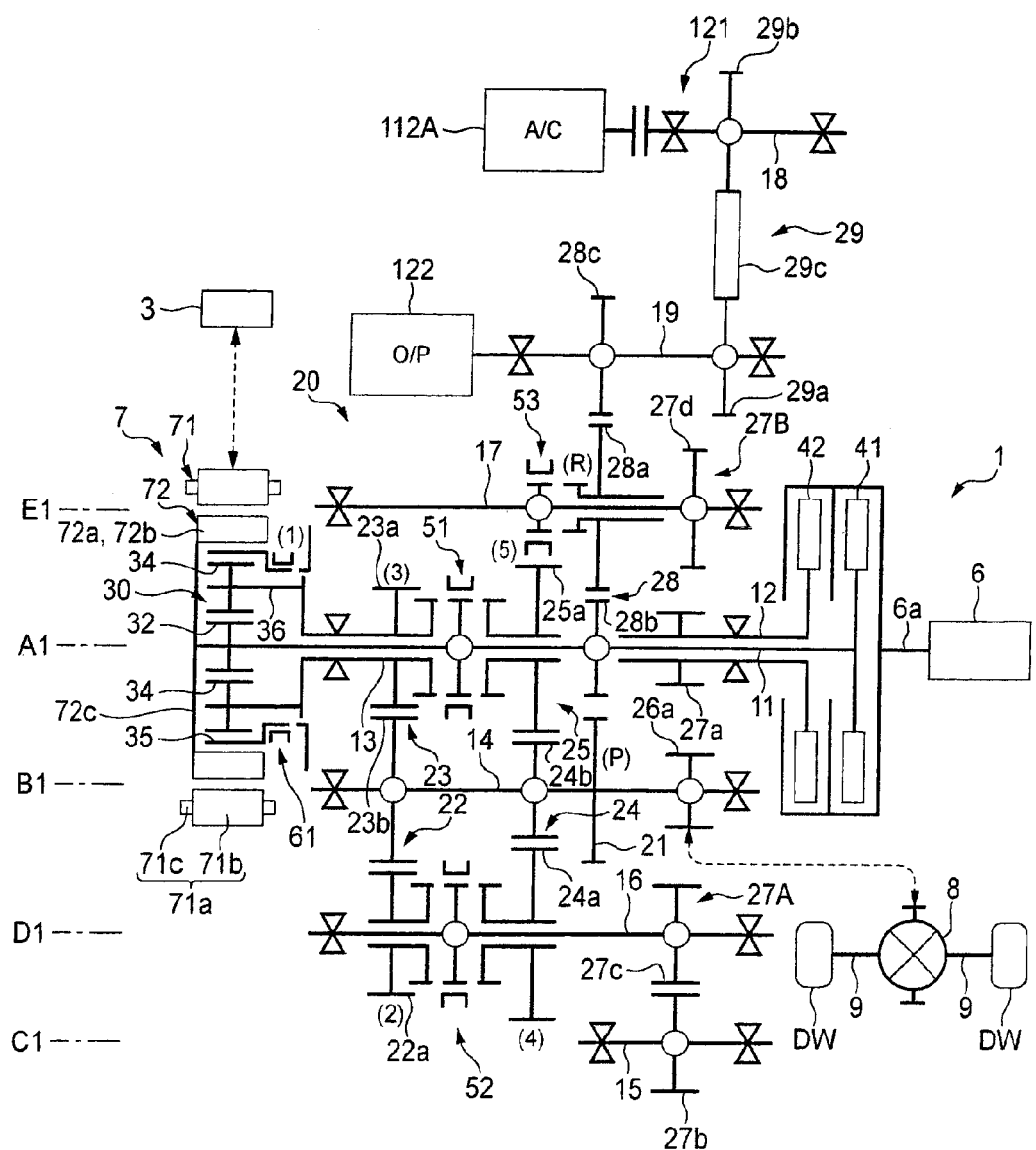
FIG. 2 is a schematic block diagram of the vehicle driving system of FIG. 1.

Firstly, a hybrid vehicle driving system of a first embodiment will be described by reference to FIGS. 1 and 2.

A hybrid vehicle driving system 1 (hereinafter, referred to as a vehicle driving system) of this embodiment is designed to drive driving wheels DW, DW (driven portions) of a vehicle (not shown) via drive shafts 9, 9 thereof and includes an internal combustion engine (hereinafter, referred to as an "engine") 6 which is a drive source, an electric motor (hereinafter, referred to as a "motor") 7, and a transmission 20 for transmitting power to the driving wheels DW, DW.

The engine 6 is a gasoline engine or a diesel engine, and a first clutch 41 (a first engaging and disengaging means) and a second clutch (a second engaging and disengaging means) of the transmission 20 are provided on a crankshaft 6a of the engine 6.

The motor 7 is a three-phase, brushless DC motor and has a stator 71 which includes 3n armatures 71a and a rotor 72 which is disposed so as to face the stator 71. The armatures 71a each include an iron core 71b and a coil 71c which is wound around the iron core 71b and are fixed to a casing, not shown, so as to be aligned about a rotating shaft at substantially equal intervals in a circumferential direction. 3n coils 71c make up n sets of coils of three phases; a U phase, a V phase and a W phase.

The rotor 72 has an iron core 72a and *n* permanent magnets 72b which are aligned about a rotating shaft at substantially equal intervals, and any two permanent magnets 72b which lie adjacent to each other have different polarities. A fixing portion 72c which fixes the iron core 72a has a hollow cylindrical shape, is disposed on an outer circumferential side of a ring gear 35 of a planetary gear mechanism 30, which will be described later, and is connected to a sun gear 32 of the planetary gear mechanism 30. By so doing, the rotor 72 is made to rotate together with the sun gear 32 of the planetary gear mechanism 30.

The planetary gear mechanism 30 has the sun gear 32, the ring gear 35 which is disposed concentrically with the sun gear 32 and which is disposed so as to surround the periphery of the sun gear 32, planetary gears 34 which are made to mesh with the sun gear 32 and the ring gear 35, and a carrier 36 which supports the planetary gears 34, allowing them to revolve on their own axes and roll "walk" around the sun gear 32. In this way, the sun gear 32, the ring gear 35 and the carrier 36 are made to rotate differentially relative to each other.

A lock mechanism 61 (a first synchromesh unit), which has a synchromesh mechanism (a synchronizer mechanism) and which is adapted to stop (lock) the rotation of the ring gear 35, is provided on the ring gear 35. It should be noted that a friction engagement unit made up of a brake and a sleeve may be used in place of the lock mechanism 61.

The transmission 20 is a so-called double-clutch type transmission which includes the first clutch 41, the second clutch 42 and the planetary gear mechanism 30, which have already been described, as well as plural change-speed gear trains, which will be described later.

More specifically, the transmission 20 includes a first main shaft 11 (a first input shaft) which is disposed coaxially with a crankshaft 6a of the engine 6 (a rotational axis A1), a second main shaft 12, a connecting shaft 13, a counter shaft 14 (an output shaft) which can rotate about a rotational axis B1 which is disposed parallel to the rotational axis A1, a first intermediate shaft 15 which can rotate about a rotational axis C1 which is disposed parallel to the rotational axis A1, a second intermediate shaft 16 (a second input shaft) which can rotate about a rotational axis D1 which is disposed parallel to the rotational axis A1, and a reverse shaft 17 which can rotate about a rotational axis E1 which is disposed parallel to the rotational axis A1.

The first clutch 41 is provided at an end of the first main shaft 11 which faces the engine 6, while the sun gear 32 of the planetary gear mechanism 30 and the rotor 72 of the motor 7 are mounted at an opposite end of the first main shaft 11 to the end which faces the engine 6. Consequently, the first main shaft 11 is selectively connected to the crankshaft 6a of the engine 6 by the first clutch 41 and is connected directly to the motor 7 so that power of the engine 6 and/or the motor 7 is transmitted to the sun gear 32.

The second main shaft 12 is formed shorter than the first main shaft 11 and hollow and is disposed rotatably relative to the first main shaft 11 so as to cover the periphery of a portion of the first main shaft 11 which lies closer to the engine 6. In addition, the second clutch 42 is provided at an end of the second main shaft 12 which faces the engine 6 and an idle drive gear 27a is mounted integrally on the second main shaft 12 at an opposite end to the end which faces the engine 6. Consequently, the second main shaft 12 is selectively connected to the crankshaft 6a of the engine 6 by the second clutch 42 so that power of the engine 6 is transmitted to the idle drive gear 27a.

The connecting shaft 13 is formed shorter than the first main shaft 11 and hollow and is disposed rotatably relative to the first main shaft 11 so as to cover the periphery of a portion of the first main shaft 11 which lies opposite to the engine 6. In addition, a third speed drive gear 23a is mounted integrally on the connecting shaft 13 at an end which faces the engine 6, and the carrier 36 of the planetary gear mechanism 30 is mounted integrally on the connecting shaft 13 at an end which lies opposite to the end which faces the engine 6. Consequently, by the planetary gears 34 rolling "walking" around the sun gear 32, the carrier 36 and the third speed drive gear 23a which are mounted on the connecting shaft 13 are made to rotate together.

Further, a fifth speed drive gear 25a is provided on the first main shaft 11 so as to rotate relative to the first main shaft 11, and a reverse driven gear 28b, which rotates together with the first main shaft 11, is mounted on the first main shaft 11. Further, a first gear change shifter 51 (a first synchromesh unit), which connects the first main shaft 11 with the third speed drive gear 23a or the fifth speed drive gear 25a and releases the connection therebetween, is provided between the third speed drive gear 23a and the fifth speed drive gear 25a. In addition, when the first gear change shifter 51 is engaged in a third speed engaging position, the first main shaft 11 and the third speed drive gear 23a are connected together to rotate together, while when the first gear change shifter 51 is engaged in a fifth speed engaging position, the first main shaft 11 and the fifth speed drive gear 25a rotate together. In addition, when the first gear change shifter 51 is in a neutral position, the first main shaft 11 rotates relative to the third speed drive gear 23a and the fifth speed drive gear 25a. When the first main shaft 11 and the third speed drive gear 23a rotate together, the sun gear 32 which is mounted on the first main shaft 11 and the carrier 36 which is connected to the third speed drive gear 23a by the connecting shaft 13 rotate together, and the ring gear 35 also rotates together, whereby the planetary gear mechanism 30 is made integral. In addition, when the first gear change shifter 51 is in the neutral position and the lock mechanism 61 is connected, the ring gear 35 is locked, and the rotation of the sun gear 32 is transmitted to the carrier 36 with the rotational speed thereof reduced.

A first idle driven gear 27b, which is adapted to mesh with the idle drive gear 27a which is mounted on the second main shaft 12, is mounted on the first intermediate shaft 15.

A second idle driven gear 27c, which is adapted to mesh with the first idle driven gear 27b which is mounted on the first intermediate shaft 15, is mounted on the second intermediate shaft 16. The second idle driven gear 27c makes up a first idle gear set 27A together with the idle drive gear 27a and the first idle driven gear 27b which have been described above. In addition, a second speed drive gear 22a and a fourth speed drive gear 24a, which are adapted to rotate relative to the second intermediate shaft 16, are provided on the second intermediate shaft 16 in such positions that the second speed drive gear 22a and the fourth speed drive gear 24a face the third speed drive gear 23a and the fifth speed drive gear 25a, respectively, which are provided around the first main shaft 11. Further, a second gear change shifter 52 (a second synchromesh unit), which is adapted to connect the second intermediate shaft 16 with the second speed drive gear 22a or the fourth speed drive gear 24a or release the connection of the shaft with the drive gear, is provided between the second speed drive gear 22a and the fourth speed drive gear 24a on the second intermediate shaft 16. Then, when the second gear change shifter 52 is engaged in a second speed engaging position, the second intermediate shaft 16 and the second speed drive gear 22a rotate together, while when the second gear change shifter 52 is engaged in a fourth speed engaging position, the second intermediate shaft 16 and the fourth speed drive gear 24a rotate together. In addition, when the second gear change shifter 52 is in a neutral position, the second intermediate shaft 16 rotates relative to the second speed drive gear 22a and the fourth speed drive gear 24a.

A first common driven gear 23b, a second common driven gear 24b, a park gear 21 and a final gear 26a are mounted integrally on the counter shaft 14 sequentially in that order from an opposite end of the counter shaft 14 to an end which faces the engine 6.

Here, the first common driven gear 23b meshes with the third speed drive gear 23a which is mounted on the connecting shaft 13 to thereby make up a third speed gear pair 23 together with the third speed drive gear 23a and meshes with the second speed drive gear 22a which is provided on the second intermediate shaft 16 to thereby make up a second speed gear pair 22 together with the second speed drive gear 22a.

The second common driven gear 24b meshes with the fifth speed drive gear 25a which is provided on the first main shaft 11 to thereby make up a fifth speed gear pair 25 together with the fifth speed drive gear 25a and meshes with the fourth speed drive gear 24a which is mounted on the second intermediate shaft 16 to thereby make up a fourth speed gear pair 24 together with the fourth speed drive gear 24a.

The final gear 26a meshes with a differential gear mechanism 8 and the differential gear mechanism 8 is connected to the driving wheels DW, DW via the drive shafts 9, 9. Consequently, power transmitted to the counter shaft 14 is outputted from the final gear 26a to the driving wheels DW, DW through the differential gear mechanism 8 and the drive shafts 9, 9.

A third idle driven gear 27d, which is adapted to mesh with the first idle driven gear 27b mounted on the first intermediate shaft 15, is mounted integrally on the reverse shaft 17. The third idle driven gear 27d makes up a second idle gear set 27B together with the idle drive gear 27a and the first idle driven gear 27b which have been described above. In addition, a reverse drive gear 28a, which is adapted to mesh with the reverse driven gear 28b which is mounted on the first main shaft 11, is provided on the reverse shaft 17 so as to rotate relative to the reverse shaft 17. The reverse drive gear 28a makes up a reverse gear set 28 together with the reverse driven gear 28b. Further, a reverse shifter 53 (a third synchromesh unit), which is adapted to connect the reverse shaft 17 with the reverse drive gear 28a or release the connection of the shaft with the drive gear, is provided on an opposite side of the reverse drive gear 28a to a side facing the engine 6. Then, when the reverse shifter 53 is engaged in a reverse engaging position, the reverse shaft 17 and the reverse drive gear 28a rotate together, while when the reverse shifter 53 is in a neutral position, the reverse shaft 17 and the reverse drive gear 28a rotate relative to each other.

The first gear change shifter 51, the second gear change shifter 52 and the reverse shifter 53 utilize a clutch mechanism having a synchromesh mechanism (a synchronizer mechanism) which makes rotational speeds of the shaft and the gear which are connected together coincide with each other.

In the transmission 20 which is configured as has been described heretofore, an odd-numbered gear train (a first gear train) which is made up of the third speed drive gear 23a and the fifth speed drive gear 25a is provided on the first main shaft 11 which is one transmission shaft of the two transmission shafts, while an even-numbered gear train (a second gear train) which is made up of the second speed drive gear 22a and the fourth speed drive gear 24a is provided on the second intermediate shaft 16 which is the other transmission shaft of the two transmission shafts.

In addition, the vehicle driving system 1 includes further an air conditioner compressor 112A and an oil pump 122. The oil pump 122 is mounted on an oil pump auxiliary shaft 19 which is disposed parallel to the rotational axes A1 to E1 so as to rotate together with the oil pump auxiliary shaft 19. An oil pump driven gear 28c, which is adapted to mesh with the reverse drive gear 28a, and an air conditioner drive gear 29a are provided on the oil pump auxiliary shaft 19 so as to rotate together, so that power of the engine 6 and/or the motor 7 which rotates the first main shaft 11 is transmitted thereto. In addition, the air conditioner compressor 112A is provided on an air conditioner auxiliary shaft 18 which is disposed parallel to the rotational axes A1 to E1 via an air conditioner clutch 121. An air conditioner driven gear 29b, to which power is transmitted from the air conditioner drive gear 29a via a chain 29c, is mounted on the air conditioner auxiliary shaft 18 so as to rotate together with the air conditioner auxiliary shaft 18, so that power of the engine 6 and/or the motor 7 is transmitted from the oil pump auxiliary shaft 19 to the air conditioner compressor 112A via an air conditioner transmission mechanism 29 which is made up of the air conditioner drive gear 29a, the chain 29c and the air conditioner driven gear 29b.

The air conditioner compressor 112A is designed so as to cut off the transmission of power by releasing the air conditioner clutch 121 by an air conditioner operating solenoid, not shown.

By being configured as has been described heretofore, the vehicle driving system 1 of this embodiment is allowed to have the following first to fifth transmission lines.

(1) A first transmission line is a transmission line in which the crankshaft 6a of the engine 6 is connected to the driving wheels DW, DW via the first main shaft 11, the planetary gear mechanism 30, the connecting shaft 13, the third speed gear pair 23 (the third speed drive gear 23a, the first common driven gear 23b), the counter shaft 14, the final gear 26a, the differential gear mechanism 8, and the drive shafts 9, 9. Here, a reduction ratio of the planetary gear mechanism 30 is set so that an engine torque transmitted to the driving wheels DW, DW via the first transmission line corresponds to a first speed. Namely, the reduction ratio of the planetary gear mechanism 30 is set so that a reduction ratio resulting when the reduction ratio of the planetary gear mechanism 30 is multiplied by a reduction ratio of the third speed gear pair 23 corresponds to the first speed.

(2) A second transmission line is a transmission line in which the crankshaft 6a of the engine 6 is connected to the driving wheels DW, DW via the second main shaft 12, the first idle gear set 27A (the idle drive gear 27a, the first idle driven gear 27b, the second idle driven gear 27c), the second intermediate shaft 16, the second speed gear pair 22 (the second speed drive gear 22a, the first common driven gear 23b) or the fourth speed gear pair 24 (the fourth speed drive gear 24a, the second common driven gear 24b), the counter shaft 14, the final gear 26a, the differential gear mechanism 8, and the drive shafts 9, 9.

(3) A third transmission line is a transmission line in which the crankshaft 6a of the engine 6 is connected to the driving wheels DW, DW via the first main shaft 11, the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9 without involving the planetary gear mechanism 30 along the transmission line.

(4) A fourth transmission line is a transmission line in which the motor 7 is connected to the driving wheels DW, DW via the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9.

(5) A fifth transmission line is a transmission line in which the crankshaft 6a of the engine 6 is connected to the driving wheels DW, DW via the second main shaft 12, the second idle gear set 27B (the idle drive gear 27a, the first idle driven gear 27b, the third idle driven gear 27d), the reverse shaft 17, the reverse gear set 28 (the reverse drive gear 28a, the reverse driven gear 28b), the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9.

In addition, in the vehicle driving system 1 of this embodiment, the motor 7 is connected to a battery 3 via a control unit which governs various controls of the vehicle in whole, and an electric power supply from the battery 3 and a regeneration of energy back to the battery 3 are implemented via the control unit. Namely, the motor 7 is driven by electric power supplied from the battery 3 via the control unit, and a regenerative electricity generation is implemented by the rotation of the driving wheels DW, DW or the power of the engine 6 during a decelerated driving so as to charge the battery 3 (recover the energy). Further, inputted into the control unit are acceleration request, braking request, engine revolution speed, motor revolution speed, motor temperature, revolving speeds of the first and second main shafts 11, 12, revolving speed of the counter shaft 14, vehicle speed, shift position, SOC (State of Charge) and the like. Then, outputted from the control unit are signals that control the engine 6, signals that control the motor 7, signals signaling the generation, charge and discharge states of the battery 3, signals that control the first and second gear change shifters 51, 52 and the reverse shifter 53, signals that control the application (lock) and release (neutral) of the lock mechanism 61 and the like.

In the vehicle driving system 1 which is configured as has been described heretofore, first to fifth speed drivings and a reverse driving, which will be described later, can be implemented by the engine 6 by controlling the engagement and disengagement of the first and second clutches 41, 42 and the engaging positions of the lock mechanism 61, the first gear change shifter 51, the second gear change shifter 52 and the reverse shifter 53.

In the first speed driving, the first clutch 41 is applied, and the lock mechanism 61 is engaged, whereby the driving force is transmitted to the driving wheels DW, DW via the first transmission line. In the second speed driving, the second clutch 42 is applied, and the second gear change shifter 52 is engaged in the second speed engaging position, whereby the driving force is transmitted to the driving wheels DW, DW via the second transmission line. In the third speed driving, the first clutch 41 is applied, and the first gear change shifter 51 is engaged in the third speed engaging position, whereby the driving force is transmitted to the driving wheels DW, DW via the third transmission line.

In addition, in the fourth speed driving, the second gear change shifter 52 is engaged in the fourth speed engaging position, whereby the driving force is transmitted to the driving wheels DW, DW via the second transmission line, and in the fifth speed driving, the first gear change shifter 51 is engaged in the fifth speed engaging position, whereby the driving force is transmitted to the driving wheels DW, DW via the third transmission line.

Additionally, the lock mechanism 61 is engaged or the first and second gear change shifters 51, 52 are pre-shifted during an engine driving, whereby the motor 7 is allowed to assist the engine driving or to implement the regeneration. Further, even when the engine is idling, the motor 7 is allowed to assist the engine 6 or to charge the battery 3. Furthermore, the first and second clutches 41, 42 are released, whereby an EV driving can be enabled by the motor 7. As driving modes of the EV driving, there exist a first speed EV mode in which the first and second clutches 41, 42 are released and the lock mechanism 61 is engaged, whereby the vehicle is allowed to be driven by way of the fourth transmission line, a third speed EV mode in which the first gear change shifter 51 is engaged in the third speed engaging position, whereby the vehicle is allowed to be driven by way of the fourth transmission line, and a fifth speed EV mode in which the first gear change shifter 51 is engaged in the fifth speed engaging position, whereby the vehicle is allowed to be driven by way of the fourth transmission line.

In addition, since the air conditioner compressor 112A is connected to the first main shaft 11, the first main shaft rotates inevitably while the vehicle is driven in an odd-numbered gear, whereby the air conditioner compressor 112A can be operated. However, when the air conditioner compressor 112A is attempted to be operated while the vehicle is driven in an even-numbered gear, it is necessary to take any of the following processes; (i) the odd-numbered gear is shifted in a neutral position and the first main shaft 11 is rotated by the motor 7, (ii) the lock mechanism 61 or the first gear change shifter 51 is pre-shifted to rotate the first main shaft 11, and (iii) the lock mechanism 61 or the first gear change shifter 51 is shifted in a neutral position and the first clutch 41 is applied so that the first main shaft 11 is rotated by the engine 6.

Consequently, when a request is made to actuate the air conditioner, the air conditioner clutch 121 is applied to actuate the air conditioner compressor 112A whether the vehicle is being driven in the odd-numbered gear or the even-numbered gear.

Here, the reverse driving by the vehicle driving system 1 will be described.

Firstly, a reverse driving by the engine 6 will be described. In order to implement the reverse driving by the engine 6, firstly, the reverse shifter 53 is engaged in a reverse engaging position, so that the reverse drive gear 28a is connected to the reverse shaft 17 to rotate together therewith. Next, the lock mechanism 61 is engaged or the first gear change shifter 51 is engaged in the third speed engaging position or the fifth speed engaging position so that the first main shaft 11 and the counter shaft 14 are connected together so as to obtain a desired reduction ratio according to a required torque. The connection of the reverse shifter 53 with the lock mechanism 61 or the first gear change shifter 51 may be implemented simultaneously, or the connection of the reverse shifter 53 with the former may be implemented earlier than with the latter or vice versa.

Then, by engaging the second clutch 42 in this state, the power of the engine 6 is transmitted to the reverse shaft 17 by way of the fifth transmission line, that is, from the second main shaft 12 via the second idle gear set 27B and is then transmitted from the reverse shaft 17 to the first transmission shaft 11 via the reverse gear set 28. As this occurs, the first main shaft 11 rotates in an opposite direction to the direction in which the first main shaft 11 rotates to drive the vehicle forwards due to the number of gears in mesh with each other. Then, the power of the engine 6 is transmitted from the planetary gear mechanism 30 or the third speed gear pair 23 or the fifth speed gear pair 25 to the counter shaft 14 depending upon the locked state of the lock mechanism 61 or the position where the first gear change shifter 51 is engaged and is further transmitted to the driving wheels DW, DW via the final gear 26a, the differential mechanism 8, and the drive shafts 9, 9.

Figure 3:
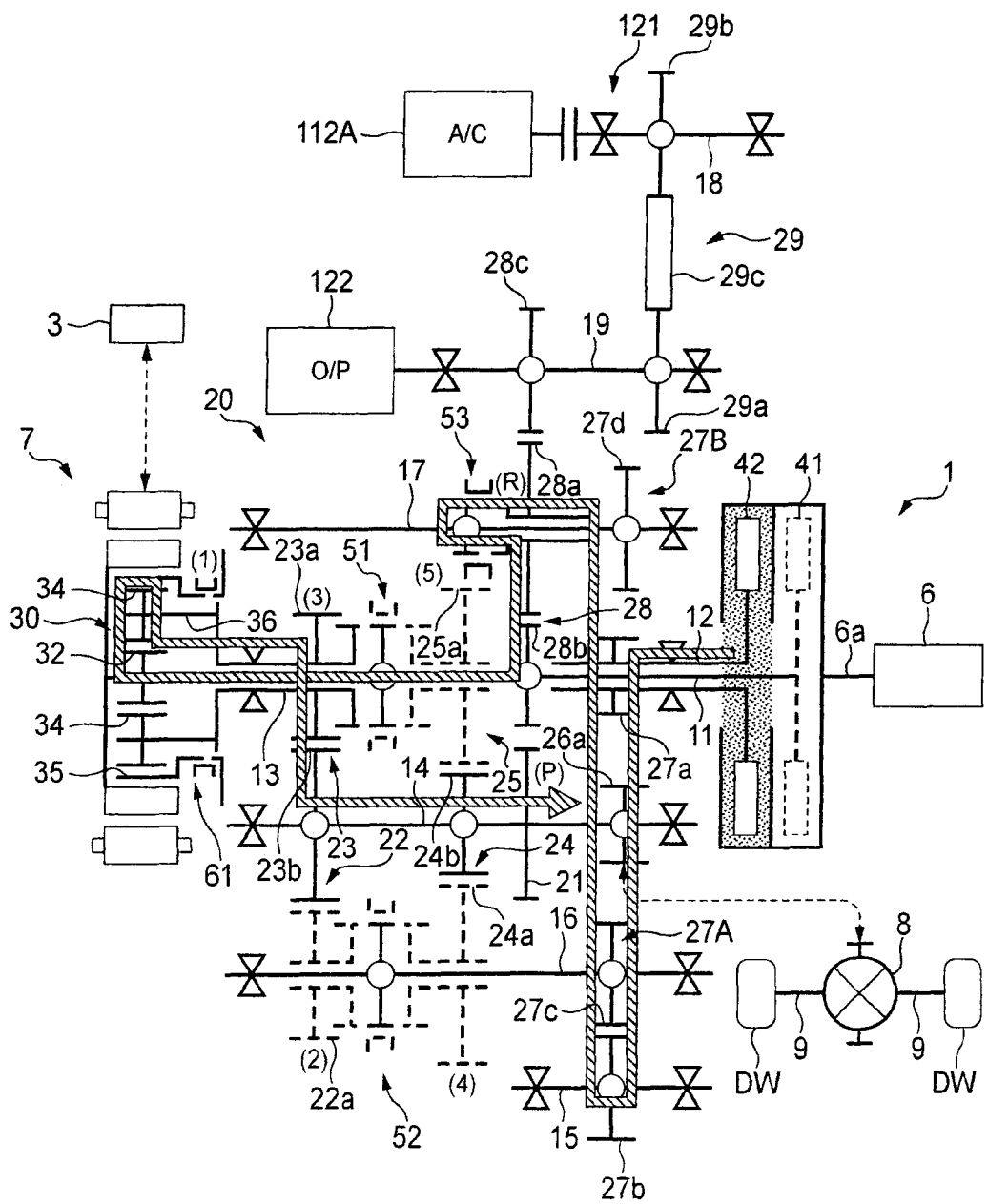
FIG. 3 is a diagram showing a state in which torque is transmitted in the vehicle driving system during a reverse driving implemented by power of an engine with a lock mechanism 61 engaged.

FIG. 3 is a diagram showing a state in which driving torque is transmitted in the vehicle driving system 1 during the reverse driving with the lock mechanism 61 engaged. By locking the lock mechanism 61, the ring gear 35 is locked, whereby a reduction ratio corresponding to the first speed is obtained from the reduction ratio of the planetary gear mechanism 30 and the reduction ratio of the third speed gear pair 23. In addition, since the power of the engine 6 is also transmitted by way of the second idle gear set 27B and the reverse gear set 28 in addition to the planetary gear mechanism 30 and the third speed gear pair 23, a larger driving torque can be obtained during the reverse driving.

Figure 4:
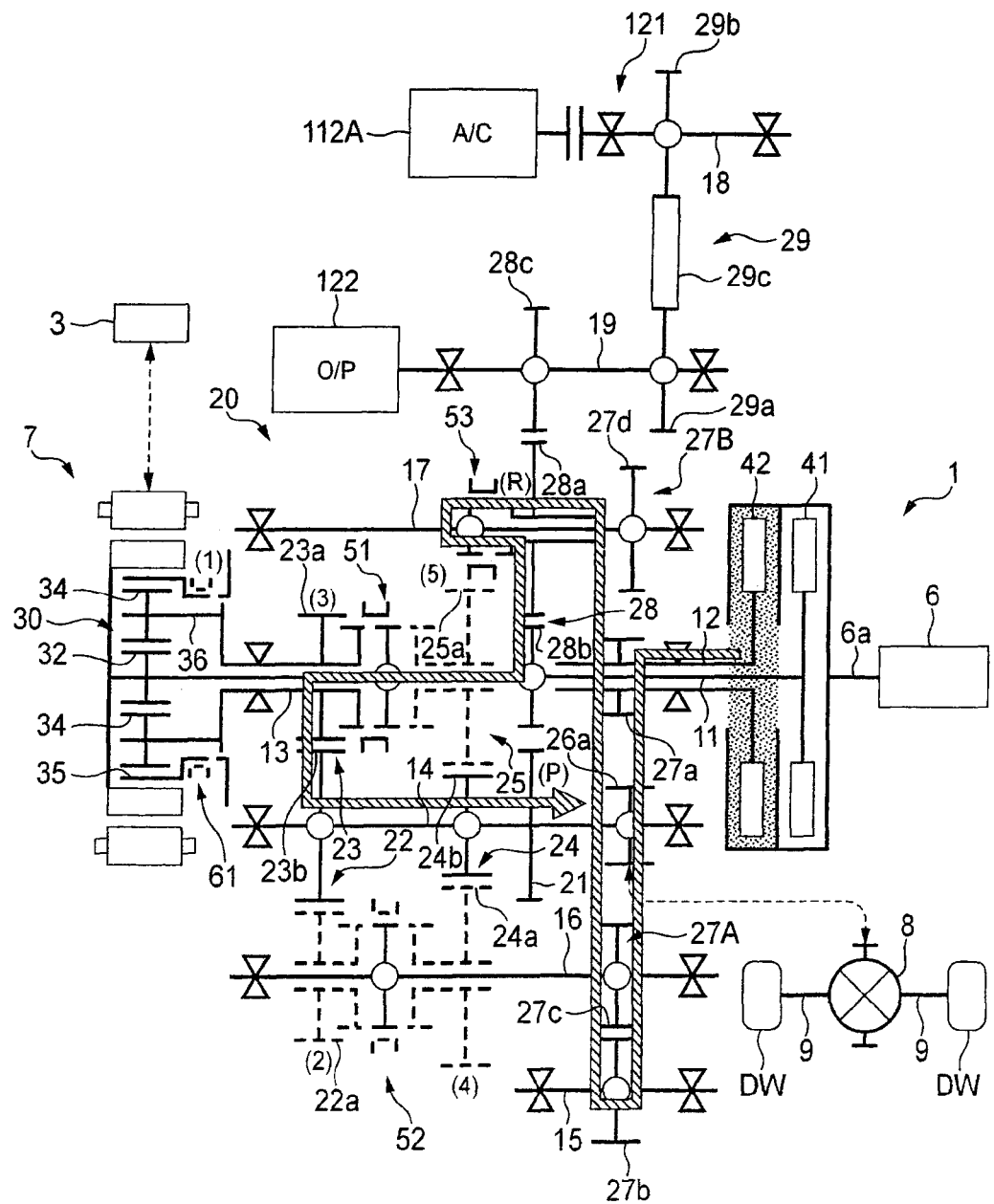
FIG. 4 is a diagram showing a state in which torque is transmitted in the vehicle driving system during the reverse driving implemented by power of the engine with a first gear change shifter 51 engaged in a third speed engaging position.
Figure 5:
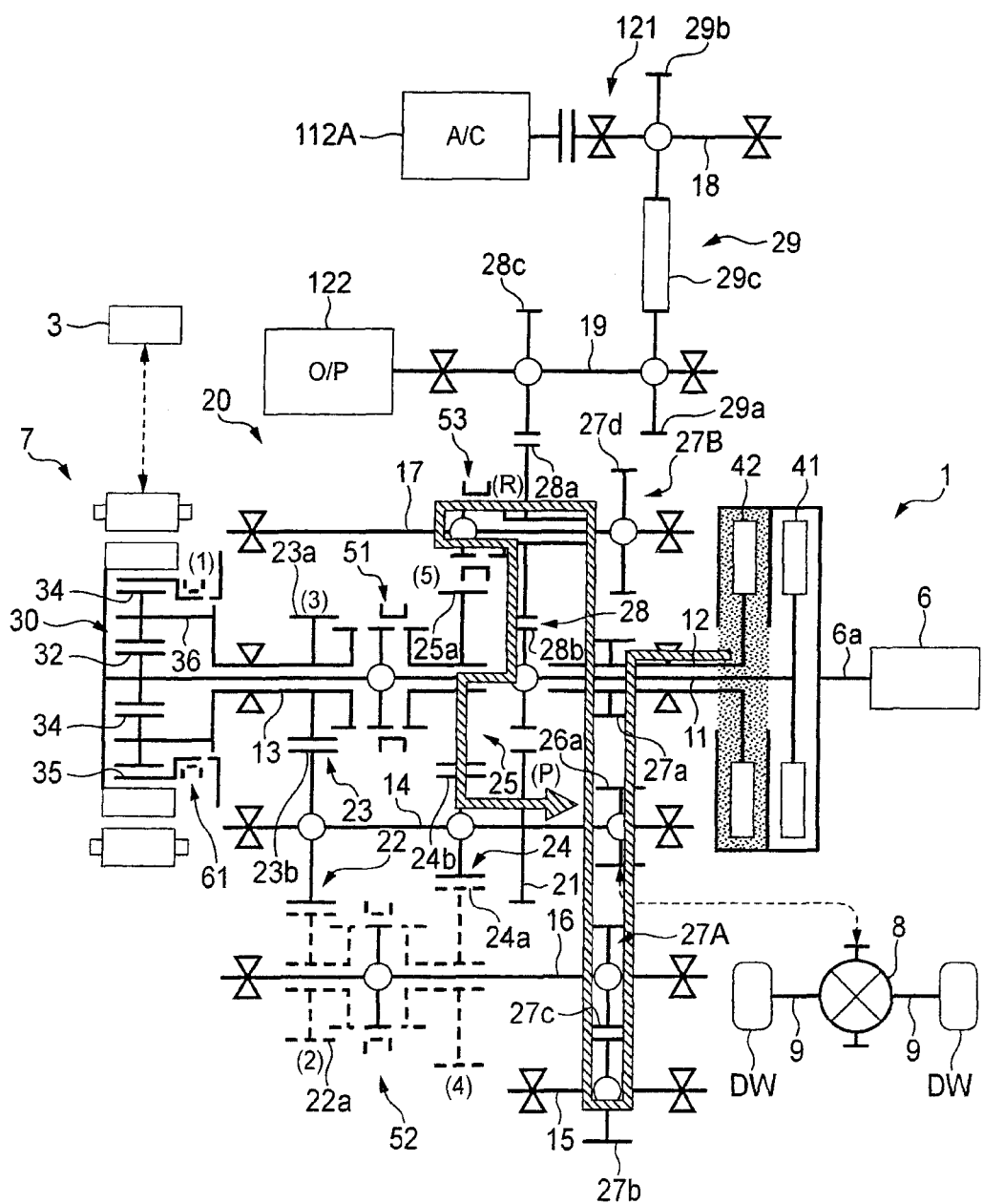
FIG. 5 is a diagram showing a state in which torque is transmitted in the vehicle driving system during the reverse driving implemented by power of the engine with the first gear change shifter 51 engaged in a fifth speed engaging position.

Consequently, when large torque is required as when the vehicle is climbing up on a steep slope, the lock mechanism 61 is engaged, whereas when relatively low torque is required as when the vehicle is running on a flat road or is climbing down a hill, in place of engaging the lock mechanism 61, the first gear change shifter 51 may be engaged in the third speed engaging position as shown in FIG. 4 or in the fifth speed engaging position as shown in FIG. 5 in consideration of the relationship between the required torque and the motor efficiency. By so doing, an optimum gear can be selected from plural gears according to the driving conditions such as the gradient of a slope or hill or running resistance of a road.

In addition, since the first main shaft 11 is connected to the motor 7, the reverse driving can be implemented while being assisted by the motor 7 by driving the motor 7 during the reverse driving by the engine 6. As this occurs, since the first main shaft 11 is rotating in the opposite direction to the direction in which the first main shaft 11 rotates to drive the vehicle forwards, the motor 7 also needs to be driven reversely. By so doing, much more large driving torque can be transmitted to the driving wheels DW, DW. Additionally, by driving the motor 7 to assist in driving or implement regeneration while the reverse driving is implemented by the engine 6 with good efficiency, the fuel economy can be increased, or when the SOC of the battery 3 is low, the SOC can be increased by driving the motor 7 for regeneration.

Here, since the reverse shifter 53 is engaged in the reverse engaging position during the reverse driving by the engine 6, a rotation of the first main shaft 11 which is opposite in direction to the rotation resulting when the first main shaft 11 rotates to drive the vehicle forwards is transmitted from the reverse drive gear 28a to the oil pump driven gear 28c and is further transmitted to the air conditioner compressor 112A via the air conditioner transmission mechanism 29. As this occurs, when the air conditioner clutch 121 is applied, the air conditioner compressor 112A rotates in an opposite direction to a direction in which it rotates when the vehicle is driven to travel forwards.

In the event that the air conditioner compressor 112A is a compressor which can rotate in both the directions, the air conditioner clutch 121 can be applied in response to a request even during the reverse driving. However, the air conditioner compressor 112A is a scroll compressor which can rotate only in one direction; reversing the scroll compressor causes the failure thereof. Consequently, to prevent the reverse rotation of the air conditioner compressor 112A during the reverse driving, the air conditioner clutch 121 is released so that the air conditioner compressor 112A idles during the reverse driving. In scroll compressors, there are some which can rotate in the reverse direction at low revolution speeds. However, even when the scroll compressor is used, the scroll compressor is allowed to run safely by releasing the air conditioner clutch 121 during the reverse driving. By adopting this configuration, relatively inexpensive scroll compressors can be used, thereby making it possible to reduce the overall costs of the vehicle driving system 1.

In addition, irrespective of the type of the air conditioner compressor 112A used, by releasing the air conditioner clutch 121 during the reverse driving, the air conditioner compressor 112A does not constitute a load, thereby making it possible to ensure a larger driving torque.

Next, a reverse driving based upon the motor 7 will be described. In order to implement a reverse driving by the motor 7 (hereinafter, referred to as a reverse EV driving), the lock mechanism 61 is locked or the first gear change shifter 51 is engaged in the third speed engaging position or the fifth speed engaging position so as to obtain a desired reduction ratio with the first and second clutches 41, 42 kept released, whereby the first main shaft 11 and the counter shaft 14 are connected together. Then, by driving the motor 7 reversely in this state, the power of the motor 7 is transmitted to the driving wheels DW, DW by way of the fourth transmission line, that is, via the planetary gear mechanism 30 or the third speed gear pair 23 or the fifth speed gear pair 25, the counter shaft 14, the final gear 26a, the differential gear mechanism 8, and the drive shafts 9, 9. As this occurs, too, since the motor 7 is driven reversely, the first main shaft 11 rotates in the opposite direction to the direction in which the first main shaft 11 rotates to drive the vehicle forwards, whereby the reverse driving is implemented. In the reverse EV driving by the motor 7 which differs from the reverse driving by the engine 6, the reverse shifter 53 does not have to be engaged in the reverse engaging position.

Figure 6:
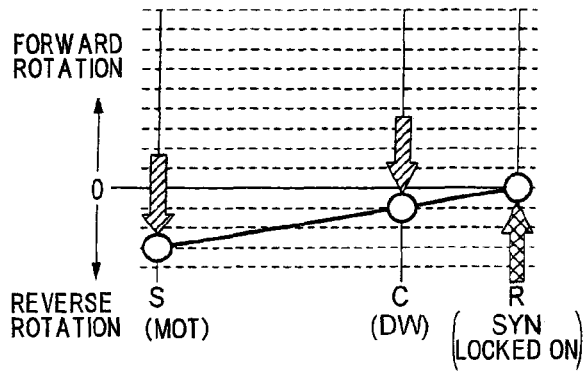
FIG. 6 shows diagrams depicting a reverse driving implemented by power of a motor, FIG. 6(*a*) is a speed collinear diagram, and FIG. 6(*b*) is a diagram showing a state in which torque is transmitted in the vehicle driving system.
Figure 6:
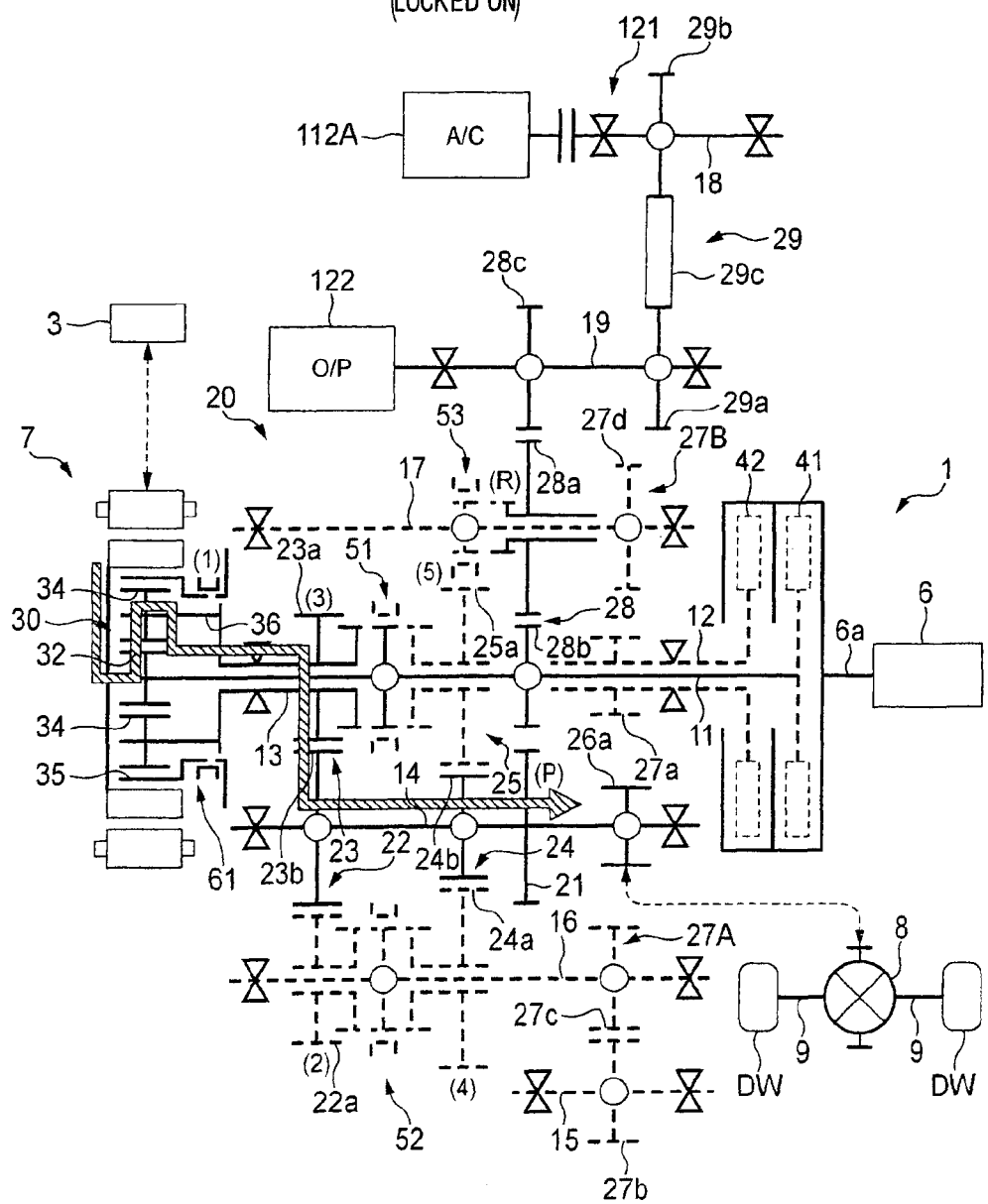

FIG. 6 shows diagrams depicting a state in which torque is transmitted in the vehicle driving system during the reverse EV driving with the lock mechanism 61 engaged. Also, in the reverse EV driving by the motor 7, as with the reverse driving by the engine, an optimum gear can be selected from plural gears according to conditions by engaging the lock mechanism 61 or engaging the first gear change shifter 51 in the third speed engaging position or the fifth speed engaging position.

In addition, since the first and second clutches 41, 42 are kept released during the reverse EV driving, there is no such situation that the power of the engine 6 is transmitted to the driving wheels DW, DW. However, the engine 6 is preferably kept running without being stopped. In many cases, the reverse driving is used when the driving of the vehicle is switched frequently and repeatedly between forward driving and reverse driving for parking. Therefore, with the engine 6 kept running, during the forward driving, for example, the vehicle is driven by means of the power of the engine 6 while regeneration is implemented by the motor 7, while during the reverse driving, the vehicle is EV reversed, and when torque is needed further during the reverse EV driving, the reverse shifter 53 is engaged and the second clutch 42 is applied so as to make use of the power of the engine 6. By so doing, when the driving of the vehicle is switched from forward driving to reverse driving, no staring operation of the engine 6 is necessary, which can simplify the control and contribute to the improvement of fuel consumption. In case no such large torque is required even when the vehicle is driven forwards and backwards repeatedly for parking, the vehicle can be driven forwards and EV reversed by the motor 7. However, by keeping the engine 6 running, it becomes possible to take a quick counteraction when a large torque is required or when the SOC of the battery 3 is lowered.

Thus, according to the embodiment that has been described heretofore, there can be provided the vehicle driving system 1 including the engine 6, the motor 7, and the transmission 20 which includes, in turn, the first main shaft 11 as the first input shaft which is connected to the motor 7 and which is connected selectively to the engine 6 via the first clutch 41, the second intermediate shaft 16 as the second input shaft which is connected selectively to the engine 6 via the second clutch 42, the counter shaft 14 which outputs power to the driving wheels DW, DW, the odd-numbered gear train which is disposed on the first main shaft 11 and which includes the plural gears which are connected selectively to the first main shaft 11 via the lock mechanism 61 or the first gear change shifter 51, the even-numbered gear train which is disposed on the second intermediate shaft 16 and which includes the plural gears which are connected selectively to the second intermediate shaft 16 via the second gear change shifter 52, and the plural gear trains which are disposed on the counter shaft 14 and which mesh with the odd-numbered gears and the even-numbered gears, wherein the reverse gear set 28, which is adapted to be connected to the second intermediate shaft 16 and which are connected selectively to the first main shaft 11 via the reverse shifter 53, is provided in the transmission 20, wherein the first main shaft 11 is caused to rotate in the reverse direction to the direction in which the first main shaft 11 rotates to implement the forward driving by the power of at least one of the engine 6 and the motor 7 so as to enable the reverse driving, and wherein any gear of the odd-numbered gear train via the lock mechanism 6 or the first gear change shifter 51. Thus, an optimum gear can be selected according to the driving conditions.

According to the embodiment, the reverse driving is implemented by means of the power of the engine 6 by engaging the reverse shifter 53 and applying the second clutch 42, whereby the power is transmitted via the reverse gear set 28 in addition to the gears of the odd-numbered gear train. Therefore, the gear ratio of the gears that are changed is increased, thereby making it possible to obtain the high torque.

According to the embodiment, the motor 7 can be rotated in the reverse direction to the direction in which the motor 7 rotates to drive the vehicle forwards so as to add the power of the motor 7 to the power of the engine 6 during the reverse driving by the engine 6. Therefore, even when a large torque is required as when climbing up on a steep gradient, the required torque can be ensured.

According to the embodiment, the fuel economy can be increased by implementing the EV reverse driving by releasing the first and second clutches 41, 42 and driving the motor 7 in the reverse direction to the direction in which the motor 7 rotates to drive the vehicle forwards.

According to the embodiment, even when the scroll compressor is connected to the first main shaft 11 via the air conditioner clutch 121 as the air conditioner compressor 112A which is allowed to rotate only when the first main shaft 11 rotates to drive the vehicle forwards, the scroll compressor can be used safely during the reverse driving by releasing the air conditioner clutch 121 to make the air conditioner compressor 112A rotate idly so that the reverse rotation of the first main shaft 11 is not transmitted to the air conditioner compressor 112A. In addition, even when torque is necessary, the air conditioner clutch 121 is released to reduce the load, thereby making it possible to ensure a larger driving torque.

According to the embodiment, the reverse driving is used much when the vehicle is driven forwards and backwards frequently and repeatedly for parking. When driving the vehicle forwards, the vehicle is driven forwards by means of the power of the engine 6 while using the motor 7 for regeneration with the first clutch 41 engaged, whereas when driving the vehicle backwards, the vehicle is reversed through EV reverse driving while making use of the engine 6 with the second clutch 42 engaged when torque is necessary.

According to the embodiment, the reverse shaft 17, which is disposed parallel to the first main shaft 11 and the second intermediate shaft 16, is provided in the transmission 20, the reverse drive gear 28a, which is connected selectively to the reverse shaft 17 via the reverse shifter 53, is provided on the reverse shaft 17, the reverse driven gear 28b, which is adapted to mesh with the reverse driven gear 28a and which is mounted so as to rotate together with the first main shaft 11, is provided on the first main shaft 11, and the reverse shaft 17 is connected to the second intermediate shaft 16 via the second idle gear set 27B. Therefore, since the reverse driving is implemented by way of the idle gear set in addition to the reverse gear set 28 and the odd-numbered gear set, a larger gear ratio can be obtained between the gears that are changed.

In FIGS. 3 to 6, the driving is illustrated as being implemented by the odd-numbered gears by engaging the lock mechanism 61 or the first gear change shifter 51. Additionally, a driving will be described which is implemented by the even-numbered gears by engaging the second gear change shifter 52 by reference.

Figure 7:
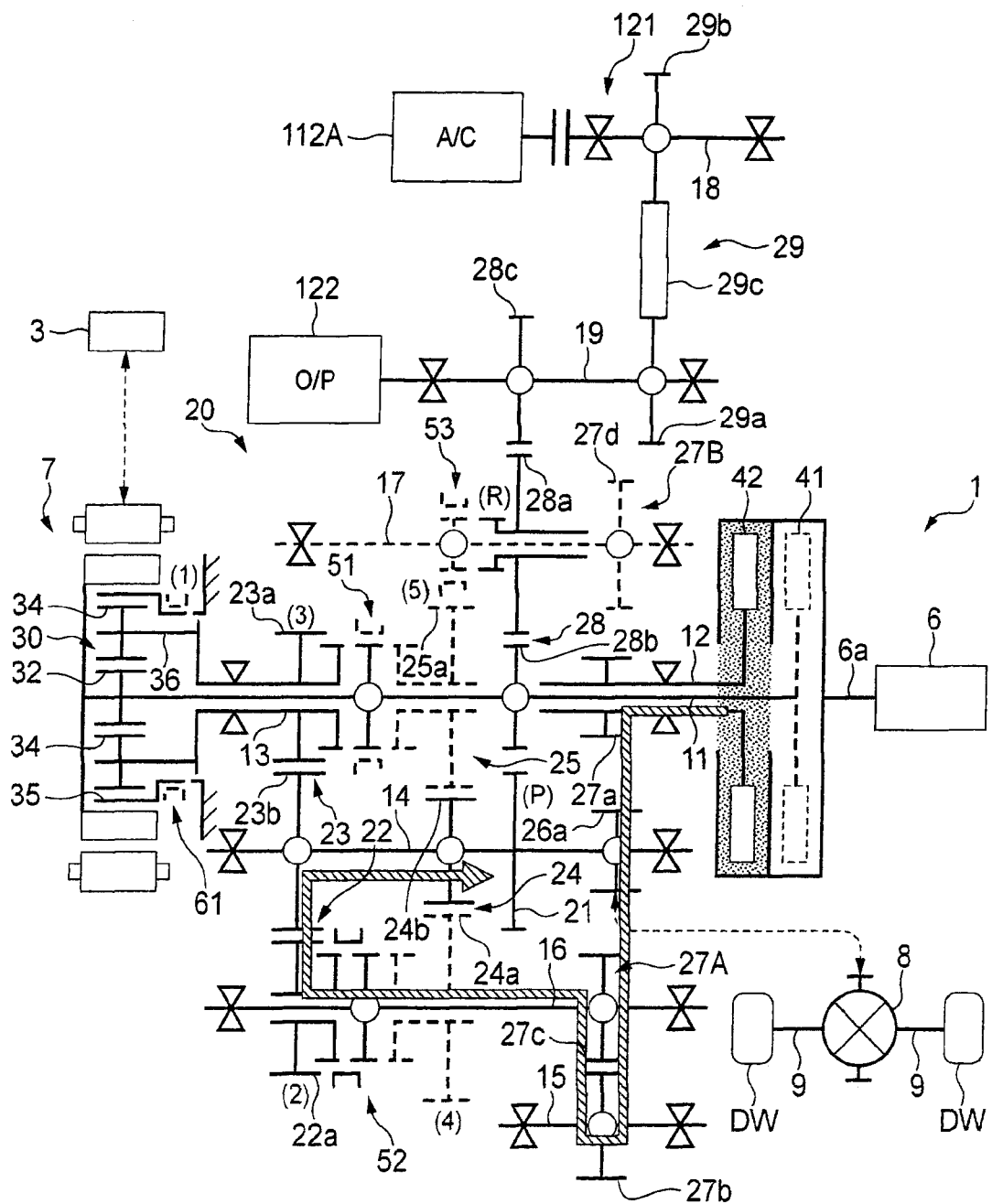
FIG. 7 is a diagram showing a state in which torque is transmitted in the vehicle driving system during a second speed driving.

A second speed driving will be described as an example of a driving which is implemented by the even-numbered gears. As shown in FIG. 7, the power of the engine 6 is transmitted to the driving wheels DW, DW by engaging the second gear change shifter 52 in the second speed engaging position so that the second speed drive gear 22*a* is connected to the second intermediate shaft 16 so as to rotate together therewith and applying the second clutch 42. In addition, by engaging the lock mechanism 61 or engaging the first gear change shifter 51 in the third speed engaging position or the fifth speed engaging position in this state, the counter shaft 14 and the first main shaft 11 are connected together so that the power can be transmitted therebetween, whereby the motor 7 can be used to assist the engine or to implement regeneration.

Second Embodiment

Figure 8:
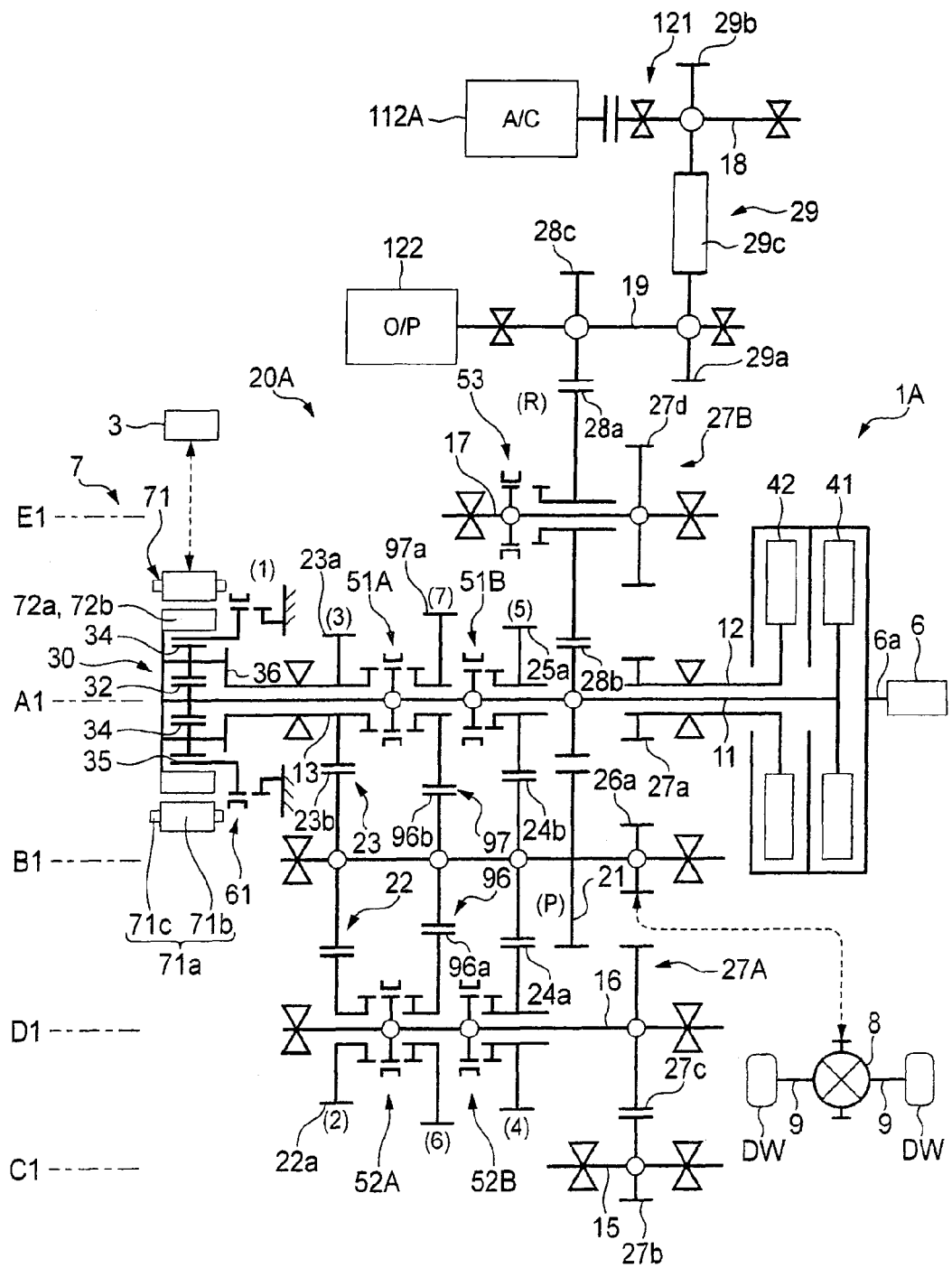
FIG. 8 is a schematic block diagram of a vehicle driving system of a second embodiment.

Next, a hybrid vehicle driving system of a second embodiment of the invention will be described by reference to FIG. 8.

A hybrid vehicle driving system 1A of this embodiment utilizes a transmission 20A in which a seventh speed drive gear 97*a* is provided further on a first main shaft 11, a sixth speed drive gear 96*a* is provided further on a second intermediate shaft 16, and a third common driven gear 96*b* is provided further on a counter shaft 14 which meshes with the seventh speed drive gear 97*a* to make up a seventh speed gear pair 97 and which meshes with the sixth speed drive gear 96*a* to make up a sixth speed gear pair 96. In FIG. 8, reference numeral 51A denotes a first odd-numbered gear change shifter which connects the first main shaft 11 with a third speed drive gear 23*a* or the seventh speed drive gear 97*a* or release the connection of the shaft with the drive gear, reference numeral 51B denotes a second odd-numbered gear change shifter 5 which connects the first main shaft 11 with a fifth speed drive gear 25*a* or releases the connection of the shaft with the drive gear, reference numeral 52A denotes a first even-numbered gear change shifter which connects the second intermediate shaft 16 with a second speed drive gear 22*a* or the sixth speed drive gear 96*a* or releases the connection of the shaft with the drive gear, and reference numeral 52B denotes a second even-numbered gear change shifter which connects the second intermediate shaft 16 with a fourth speed drive gear 24*a* or release the connection of the shaft with the drive gear. According to this vehicle driving system 1A, by applying a second clutch 42 with the first odd-numbered gear change shifter 51A engaged in a seventh speed engaging position, a reverse driving can also be implemented by way of the seventh speed gear pair 97.

Third Embodiment

Figure 9:
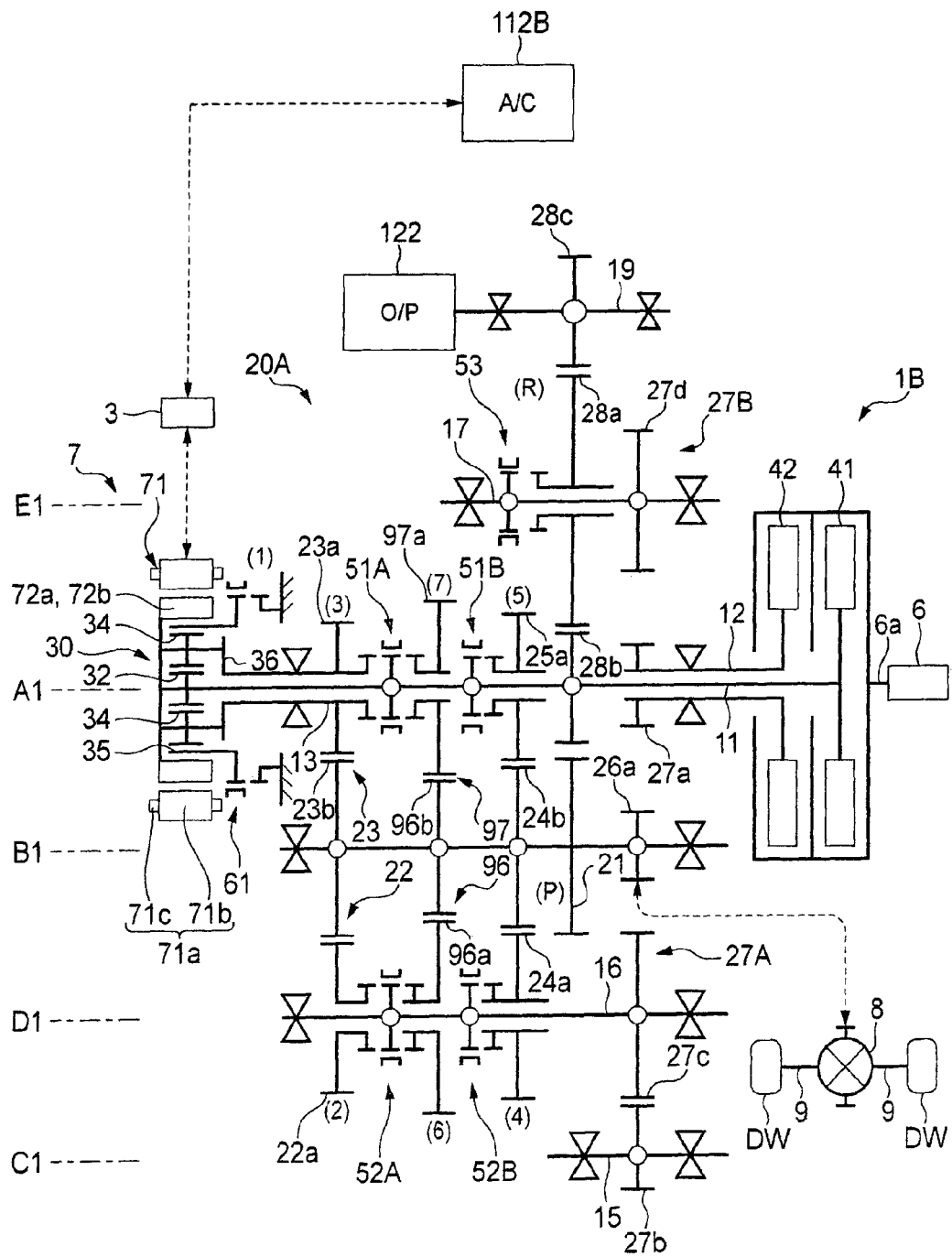
FIG. 9 is a schematic block diagram of a vehicle driving system of a third embodiment.

Next, a hybrid vehicle driving system of a third embodiment of the invention will be described by reference to FIG. 9.

A hybrid vehicle driving system 1B of this embodiment is common to the hybrid driving system 1A of the second embodiment in that sixth and seventh speed gear pairs 96, 97 are provided on the transmission 20A as with the second embodiment but differs from the hybrid driving system 1A of the second embodiment in that an electric air conditioner compressor 112B is used in place of the air conditioner compressor 112A.

The electric air conditioner compressor 112B is supplied with electric power by a battery 3 and can be operated independently of the transmission 20A.

In the hybrid vehicle driving system 1B of this embodiment, too, a reverse driving can be implemented by means of the power of an engine 6 or the power of a motor 7. To implement the reverse driving by means of the power of the engine 6, firstly, a reverse shifter 53 is engaged in a reverse engaging position, so that a reverse drive gear 28*a* is connected to a reverse shaft 17 so as to rotate together therewith. In addition, in order to obtain a desired reduction ratio according to a required torque, a lock mechanism 61 is engaged or first and second odd-numbered gear change shifters 51A, 51B are engaged so as to connect a first main shaft 11 with a counter shaft 14 via an appropriate gear set.

Then, by applying a second clutch 42 in this state, the power of the engine 6 is transmitted to a reverse shaft 17 by way of a fifth transmission line, that is, from a second intermediate shaft 12 via a second idle gear set 27B and is then transmitted from the reverse shaft 17 to the first main shaft 11 via a reverse drive gear set 28. As this occurs, the first main shaft 11 rotates in an opposite direction to a direction in which the first main shaft 11 rotates to drive the vehicle forwards due to the number of gears in mesh with each other. Then, the power of the engine 6 is transmitted from a planetary gear mechanism 30 or a third speed gear pair 23 or a fifth speed gear pair 25 or a seventh speed gear pair 97 to the counter shaft 14 depending upon the locked state of the lock mechanism 61 or the position where the first gear change shifter 51 is engaged and is further transmitted to driving wheels DW, DW via a final gear 26*a*, a differential mechanism 8, and drive shafts 9, 9.

Figure 10:
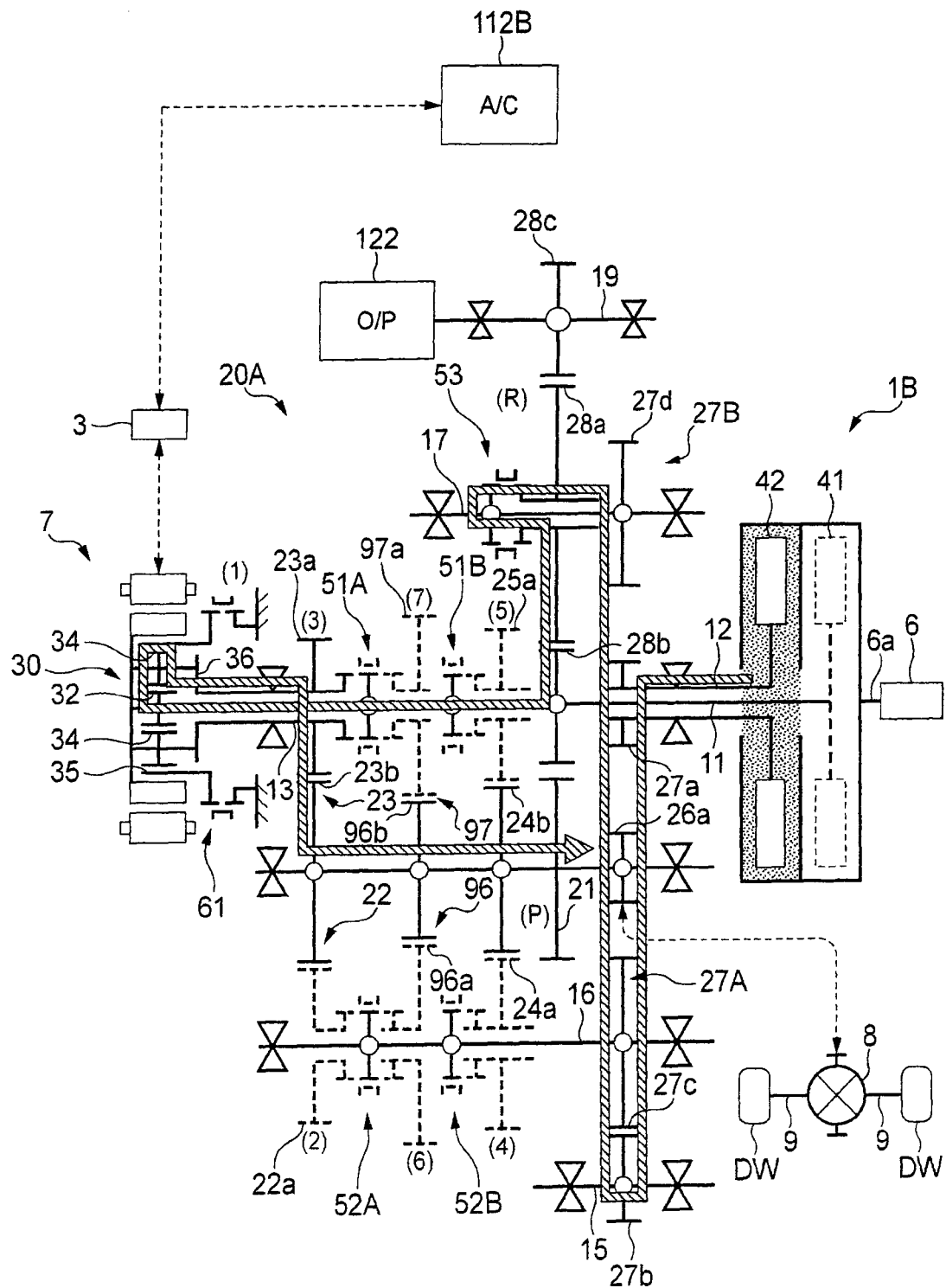
FIG. 10 is a diagram showing a state in which torque is transmitted in the vehicle driving system shown in FIG. 9 during a reverse driving implemented by power of an engine with a lock mechanism 61 engaged.

FIG. 10 is a diagram showing a state in which driving torque is transmitted in the vehicle driving system 1 during the reverse driving with the lock mechanism 61 engaged. By engaging the lock mechanism 61, a ring gear 35 is locked, whereby a reduction ratio corresponding to a first speed is obtained from a reduction ratio of the planetary gear mechanism 30 and a reduction ratio of the third speed gear pair 23. In addition, since the power of the engine 6 is also transmitted by way of a second idle gear set 27B and a reverse gear set 28 in addition to the planetary gear mechanism 30 and the third speed gear pair 23, a larger driving torque can be obtained during the reverse driving.

Figure 11:
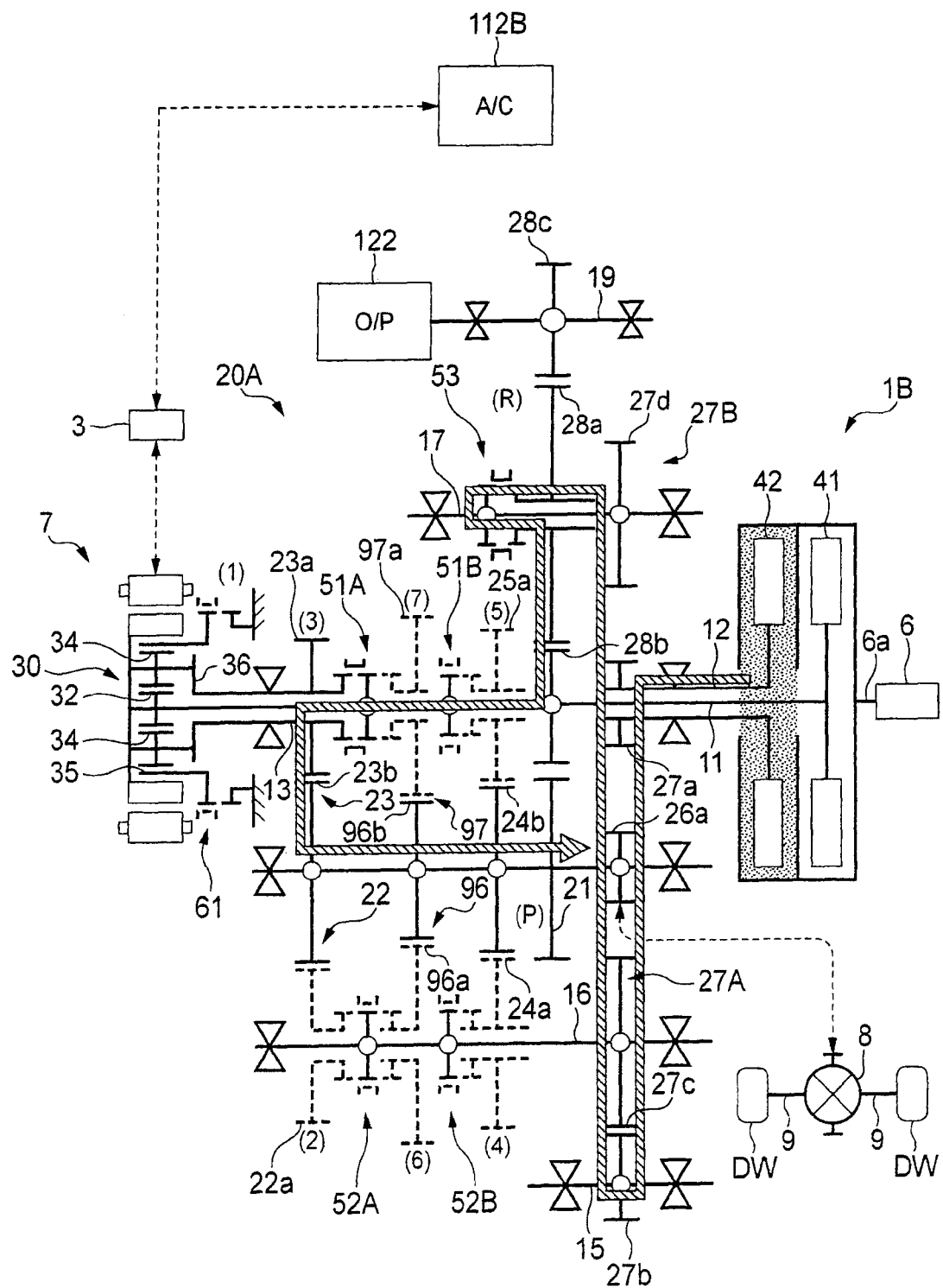
FIG. 11 is a diagram showing a state in which torque is transmitted in the vehicle driving system shown in FIG. 9 during the reverse driving implemented by power of the engine with a first odd-numbered gear change shifter 51A engaged in a third speed engaging position.
Figure 12:
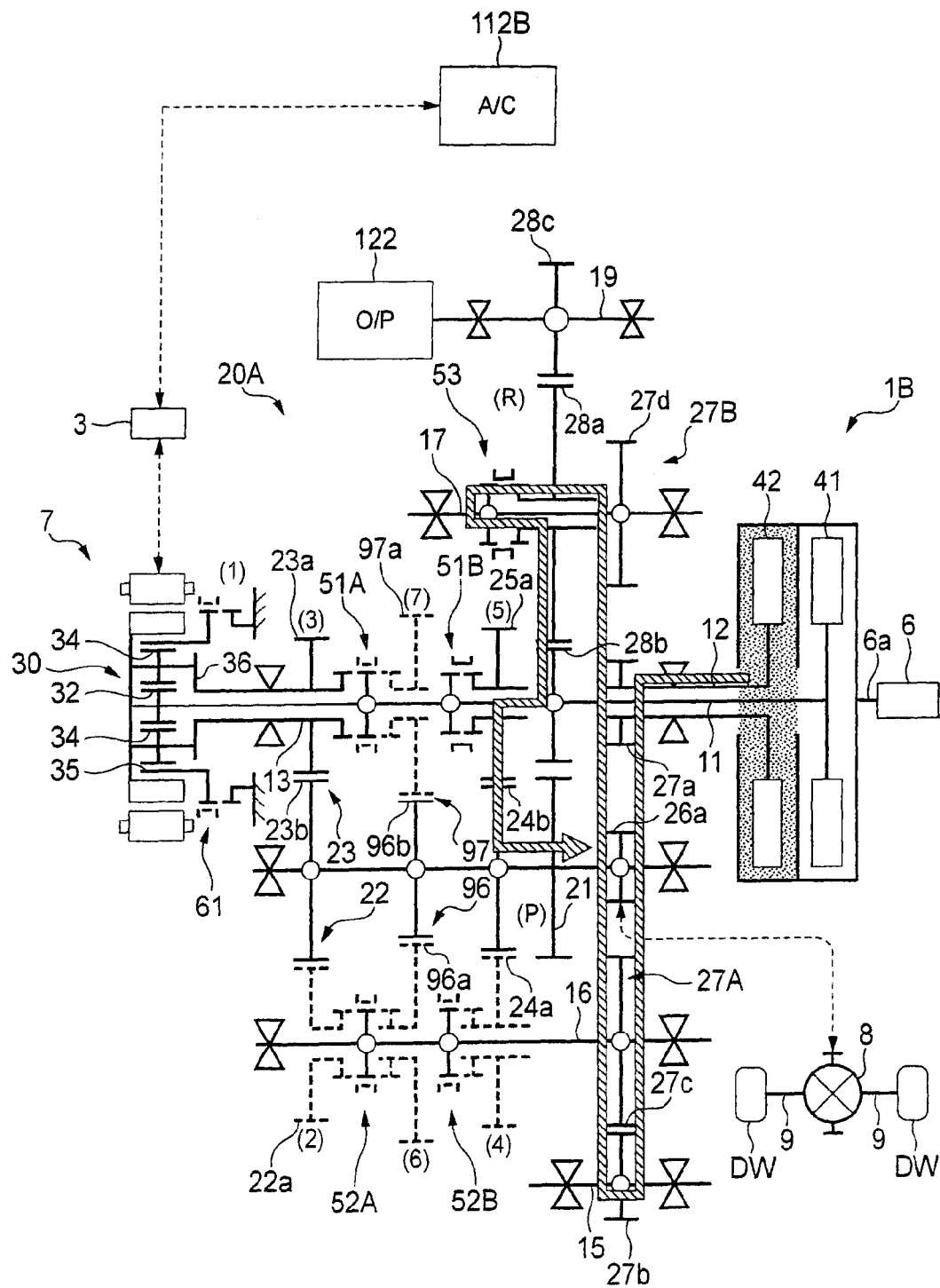
FIG. 12 is a diagram showing a state in which torque is transmitted in the vehicle driving system shown in FIG. 9 during the reverse driving implemented by power of the engine with a second odd-numbered gear change shifter 51B engaged.
Figure 13:
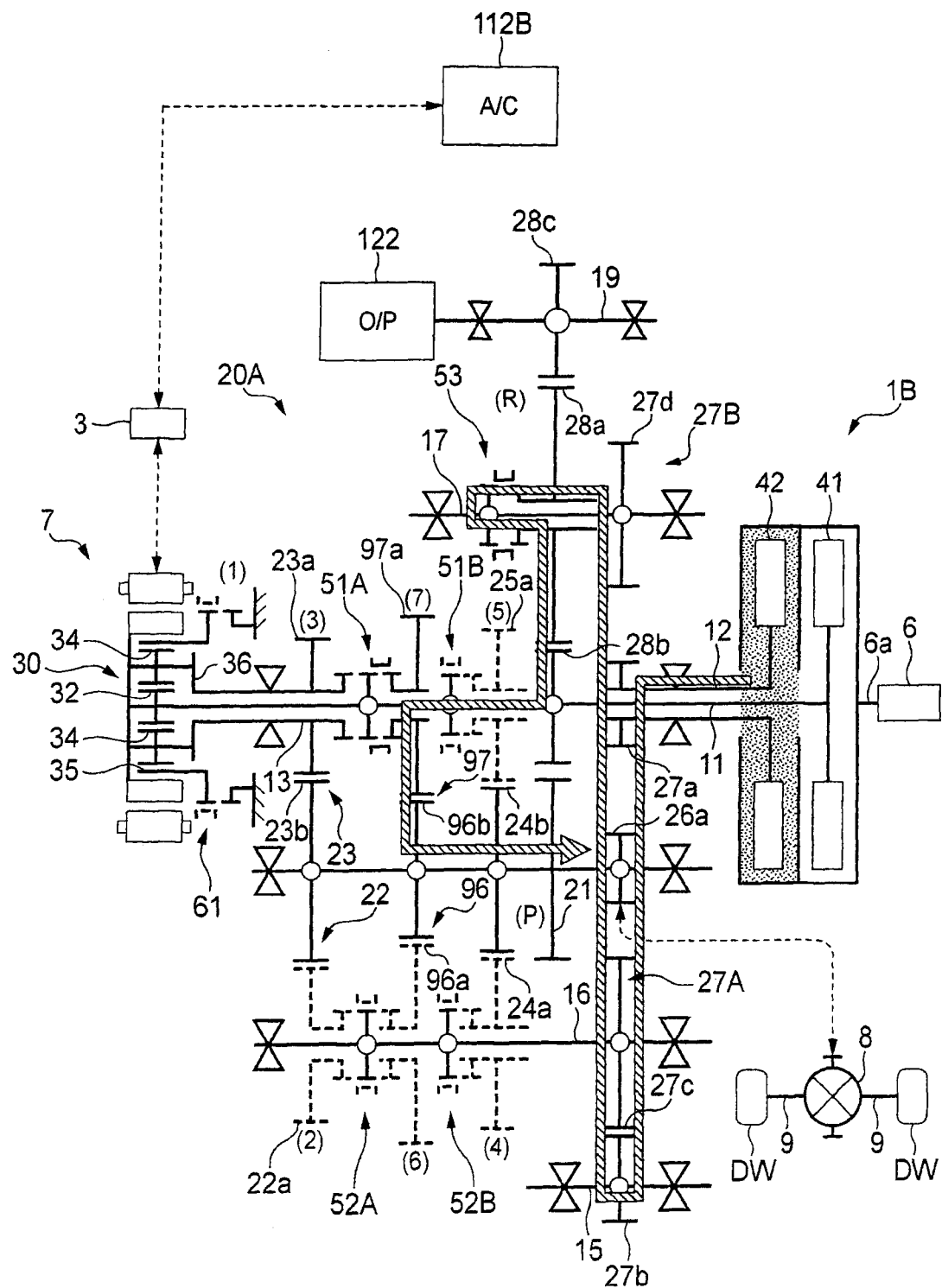
FIG. 13 is a diagram showing a state in which torque is transmitted in the vehicle driving system shown in FIG. 9 during the reverse driving implemented by power of the engine with the first odd-numbered gear change shifter 51A engaged in a seventh speed engaging position.

In addition, instead of engaging the lock mechanism 61 in consideration of the relationship between a required torque and motor efficiency, the first odd-numbered gear change shifter 51A may be engaged in a third speed engaging position as shown in FIG. 11, the second odd-numbered gear change shifter 51B may be engaged as shown in FIG. 12, or the first odd-numbered gear change shifter 51A may be engaged in a seventh speed engaging position as shown in FIG. 13. By so doing, an optimum gear can be selected from the plural gears depending upon driving conditions such as the gradient of a slope or running resistance of a road. Further, since the first main shaft 11 is connected to the motor 7, by driving the motor 7 during the reverse driving by the engine 6, the reverse driving can be implemented while being assisted by the motor 7.

Even when a reverse driving is implemented by the motor 7, the lock mechanism 61 is engaged or the first and second odd-numbered gear change shifters 51A, 51B are engaged to connect the first main shaft 11 is connected to the counter shaft 14 via an appropriate gear set so as to obtain a desired reduction ratio with first and second clutches 41, 42 kept released. Then, by driving the motor 7 reversely in this state, the power of the motor 7 is transmitted to the driving wheels DW, DW by way of a fourth transmission line, that is, via the planetary gear mechanism 30 or the third speed gear pair 23 or the fifth speed gear pair 25 or the seventh speed gear pair 97, the counter shaft 14, the final gear 26*a*, the differential gear mechanism 8, and the drive shafts 9, 9. As this occurs, too, since the motor 7 is driven reversely, the first main shaft 11 rotates reversely to the direction in which the first main shaft 11 rotates to drive the vehicle forwards, whereby the reverse driving is implemented. In the reverse EV driving by the motor 7 which is different from the reverse driving by the engine 6, the reverse shifter 53 does not have to be engaged in a reverse engaging position.

Figure 14:
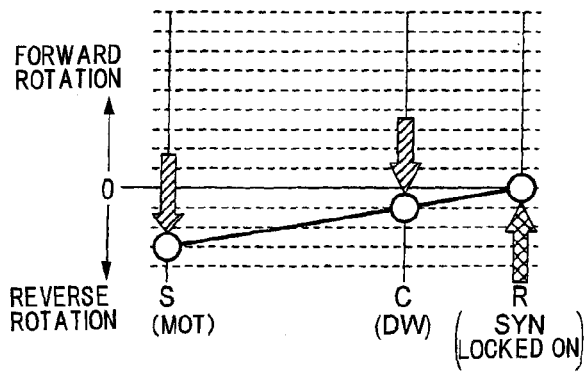
FIG. 14 shows a reverse driving implemented by power of a motor in the vehicle driving system shown in FIG. 9, FIG. 14(*a*) is a speed collinear diagram, and FIG. 14(*b*) is a diagram showing a state in which torque is transmitted in the vehicle driving system shown in FIG. 9.
Figure 14:
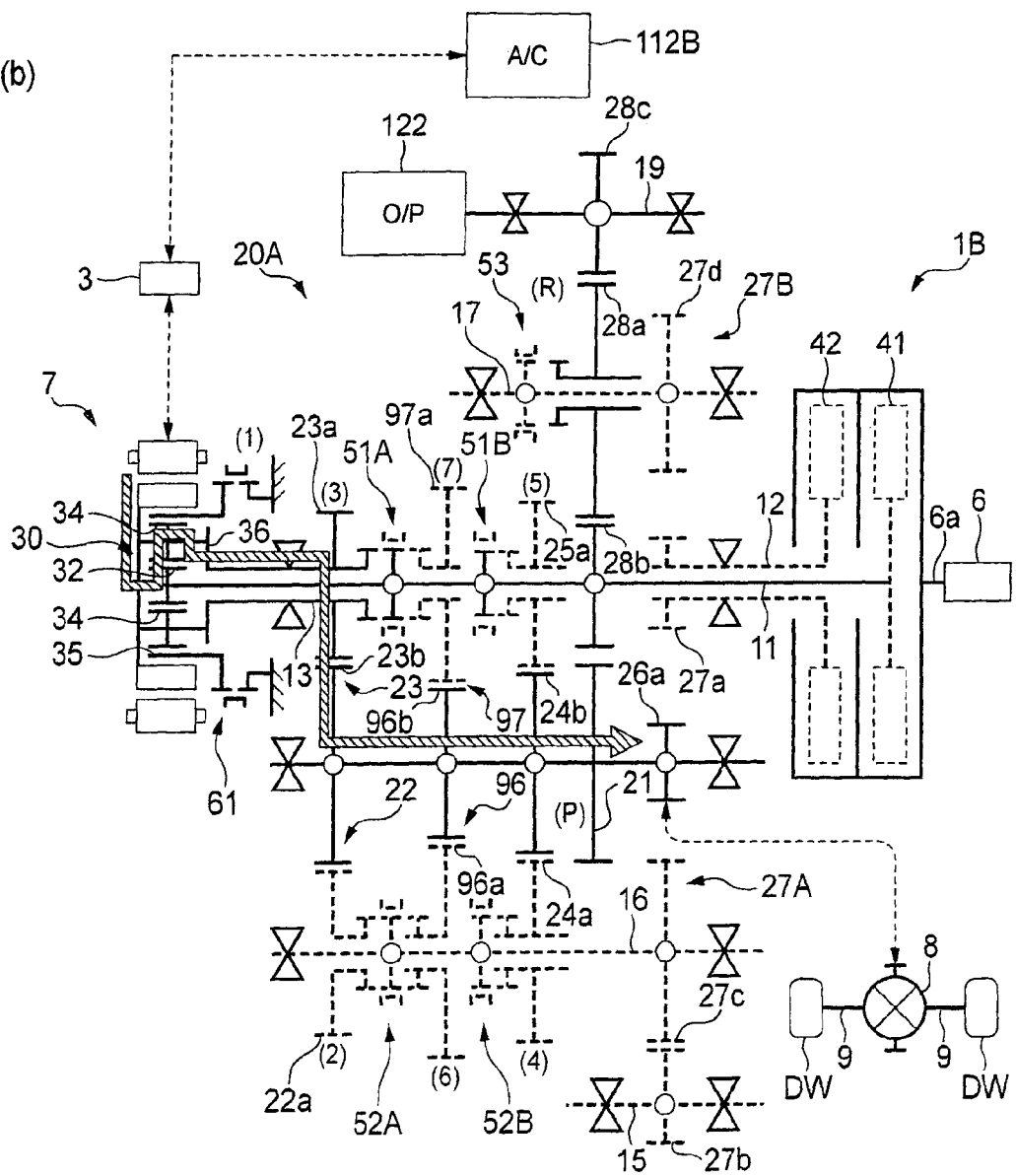
Figure 15:
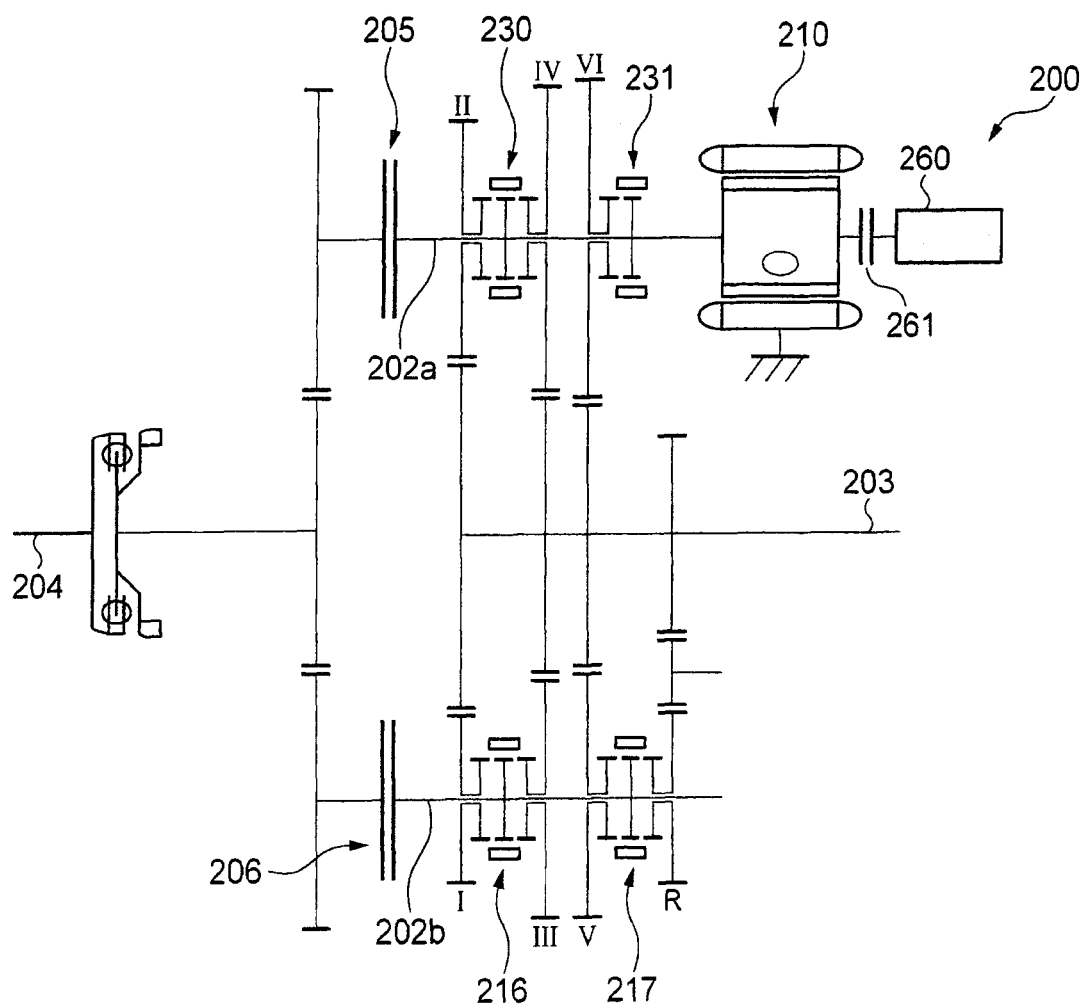
FIG. 15 is a schematic diagram of a vehicle driving system of Patent Document 1.

FIG. 14 shows diagrams depicting a state in which torque is transmitted in the vehicle driving system during the reverse EV driving with the lock mechanism 61 engaged. In the reverse EV driving by the motor 7, too, as with the reverse driving by the engine, by engaging the lock mechanism 61 or engaging the first and second odd-numbered gear change shifters 51A, 51B to select an appropriate gear set, an optimum gear can be selected from the plural gears depending on the conditions.

The invention is not limited to the embodiments that have been described heretofore and hence can be modified or improved as required.

For example, in the vehicle driving systems 1, 1A, 1B, the odd-numbered gears are disposed on the first main shaft which is the input shaft to which the motor 7 of the double-clutch type transmission, while the even-numbered gears are disposed on the second intermediate shaft 16 which is the input shaft to which the motor 7 is not connected. However, the invention is not limited thereto, and hence, a configuration may be adopted in which the even-numbered gears are disposed on the first main shaft 11 which is the input shaft to which the motor 7 is connected, while the odd-numbered gears are disposed on the second intermediate shaft 16 which is the input shaft to which the motor 7 is not connected. Additionally, needless to say, the number of speed gears that are changed can be increased or decreased.

In addition, in place of the first common driven gear 23*b* and the second common driven gear 24*b*, plural driven gears may be provided so as to mesh individually with corresponding gears. Additionally, the planetary gear mechanism 30 is illustrated as the first speed drive gear, however, the invention is not limited thereto. For example, a first speed drive gear may be provided in a similar way to the way in which the third speed drive gear 23*a* is provided.

This patent application is based on Japanese Patent Application (No. 2010-081009) filed on Mar. 31, 2010, the contents of which are incorporated herein by reference.

DESCRIPTION OF REFERENCE NUMERALS AND CHARACTER

1 Vehicle driving system;
6 Engine (Internal combustion engine);
7 Motor (Electric motor);
11 First main shaft (First input shaft);
14 Counter shaft (Output shaft);
16 Second intermediate shaft (Second input shaft);
20 Transmission (Transmission mechanism);
22*a* Second speed drive gear;
23*a* Third speed drive gear;
23*b* First common driven gear;
24*a* Fourth speed drive gear;
24*b* Second common driven gear;
25*a* Fifth speed drive gear;
27A First idle gear set;
27B Second idle gear set;
28 Reverse gear set;
28*a* Reverse drive gear;
28*b* Reverse driven gear;
30 Planetary gear mechanism;
41 First clutch (First engaging and disengaging means);
42 Second clutch (Second engaging and disengaging means);
51 First gear change shifter (First Synchromesh unit);
51A First odd-numbered gear change shifter (First synchromesh unit);
51B Second odd-numbered gear change shifter (First synchromesh unit);
52 Second gear change shifter (Second synchromesh unit);
52A First even-numbered gear change shifter (Second synchromesh unit);
52B Second even-numbered gear change shifter (Second synchromesh unit);
53 Reverse shifter (Third synchromesh unit);
61 Lock mechanism (First synchromesh unit);
96*a* Sixth speed drive gear;
96*b* Third common driven gear;
97*a* Seventh speed drive gear;
112A Air conditioner compressor;
112B electric air conditioner compressor;
121 Air conditioner clutch.

The invention claimed is:

1. A vehicle driving system comprising:
an internal combustion engine;
an electric motor; and
a transmission mechanism comprising:
a first input shaft which is connected to the electric motor and which is connected selectively to the internal combustion engine via a first engaging and disengaging means;
a second input shaft which is connected selectively to the internal combustion engine via a second engaging and disengaging means;
an output shaft which outputs power to a driven portion;
a first gear train which is disposed on the first input shaft and which is made up of a plurality of gears which are connected selectively to the first input shaft via a first switching unit;
a second gear train which is disposed on the second input shaft and which is made up of a plurality of gears which are connected selectively to the second input shaft via a second switching unit; and
a third gear train which is disposed on the output shaft and which is made up of a plurality of gears which mesh with the gears of the first gear train and the gears of the second gear train, wherein:
a reverse gear set is provided in the transmission mechanism which is connected to the second input shaft and which is connected selectively to the first input shaft via a third switching unit; and
a reverse driving can be implemented by rotating the first input shaft in a reverse direction to a direction in which the first input shaft rotates to implement a forward driving by means of power of the internal combustion engine that is transmitted via the reverse gear set or by means of power of the electric motor,
wherein the plurality of gears of the first gear train are selectable by the first switching unit when the reverse driving is implemented by the internal combustion engine.

2. The vehicle driving system according to claim 1, wherein
the reverse driving is implemented by the power of the internal combustion engine, by engaging the third switching unit and applying the second engaging and disengaging means.

3. The vehicle driving system according to claim 2, wherein
the electric motor is driven in a reverse direction to a direction in which the electric motor is driven for a forward driving during the reverse driving by the internal combustion engine so as to add the power of the electric motor.

4. The vehicle driving system according to claim 1, wherein
an EV reverse driving is implemented by releasing the first and second engaging and disengaging means and driving the electric motor in the reverse direction to the direction in which the electric motor is driven for the forward driving.

5. The vehicle driving system according to claim 2, wherein:
an air conditioner compressor, which is adapted to rotate only when the first input shaft rotates for the forward driving, is connected to the first input shaft via an air conditioner clutch; and
when the reverse driving is implemented, the air conditioner clutch is released so that a reverse rotation of the first input shaft is not transmitted to the air conditioner compressor to thereby rotate the air conditioner compressor idly.

6. The vehicle driving system according to claim 4, wherein
when the EV reverse driving is implemented, the internal combustion engine is kept running with the first and second engaging and disengaging means kept released.

7. The vehicle driving system according to claim 1, wherein:
a reverse shaft, which is disposed parallel to the first and second input shafts, is provided in the transmission mechanism;
a reverse drive gear, which is adapted to be connected selectively to the reverse shaft via the third switching unit, is provided on the reverse shaft;
a reverse driven gear, which is mounted so as to mesh with the reverse drive gear to thereby rotate together with the first input shaft, is provided on the first input shaft; and
the reverse shaft is connected to the second input shaft via an idle gear set.

* * * * *